US012643041B2

(12) United States Patent
Smullen et al.

(10) Patent No.: US 12,643,041 B2
(45) Date of Patent: Jun. 2, 2026

(54) METHODS AND SYSTEMS FOR RENDERING AND ENCODING CONTENT FOR ONLINE INTERACTIVE SESSIONS

(71) Applicant: GOOGLE LLC, Mountain View, CA (US)

(72) Inventors: Clinton Smullen, Sunnyvale, CA (US); Dov Zimring, Belmont, CA (US); Jani Huoponen, Los Gatos, CA (US); Aki Kuusela, Palo Alto, CA (US); Jean-Francois Roy, San Francisco, CA (US); Paul Lalonde, Kitchener (CA); Paul Leventis, Toronto (CA)

(73) Assignee: GOOGLE LLC, Mountain View, CA (US)

( * ) Notice: Subject to any disclaimer, the term of this patent is extended or adjusted under 35 U.S.C. 154(b) by 200 days.

(21) Appl. No.: 18/213,399

(22) Filed: Jun. 23, 2023

(65) Prior Publication Data

US 2023/0330533 A1      Oct. 19, 2023

Related U.S. Application Data

(63) Continuation of application No. 17/521,133, filed on Nov. 8, 2021, now Pat. No. 11,701,587, which is a
(Continued)

(51) Int. Cl.
*A63F 13/53* (2014.01)
*A63F 13/35* (2014.01)
(Continued)

(52) U.S. Cl.
CPC .............. *A63F 13/53* (2014.09); *A63F 13/35* (2014.09); *A63F 13/358* (2014.09);
(Continued)

(58) Field of Classification Search
CPC combination set(s) only.
See application file for complete search history.

(56) References Cited

U.S. PATENT DOCUMENTS 5,995,518 A      11/1999  Burns et al.
8,698,828 B2      4/2014  Plowman et al.
(Continued)

FOREIGN PATENT DOCUMENTS

CN            1642249 A      7/2005
CN          101889422 A      11/2010
(Continued)

OTHER PUBLICATIONS

Translation of Korean Office Action mailed Sep. 25, 2023 for KR Application No. 10-2023-7002848, 58 pages.
(Continued)

*Primary Examiner* — Daniel Chang

(57)            ABSTRACT

This application is directed to a method of managing processing capability of a server system having one or more processing cores that further include multiple processing slices. Upon receiving requests to initiate online gaming sessions, the server system allocates each processing slice of the processing cores to a subset of the online gaming sessions to be executed thereon. A first processing slice is allocated to a first subset of the online gaming sessions including a first gaming session and a second gaming session. At the first processing slice, a time-sharing processing schedule is determined for the first subset of the online gaming sessions. In accordance with the time-sharing processing schedule, the first and second gaming sessions share a duty cycle of the first processing slice, and are executed dynamically and in parallel according to real-time data processing need of the first and second gaming sessions.

19 Claims, 17 Drawing Sheets

Related U.S. Application Data continuation of application No. 16/849,805, filed on Apr. 15, 2020, now Pat. No. 11,369,873, which is a continuation of application No. PCT/US2019/020935, filed on Mar. 6, 2019.

(60) Provisional application No. 62/646,824, filed on Mar. 22, 2018.

(51) Int. Cl.

| | |
|---|---|
| *A63F 13/358* | (2014.01) |
| *H04N 19/176* | (2014.01) |
| *H04N 19/436* | (2014.01) |
| *A63F 13/86* | (2014.01) |

(52) U.S. Cl.
CPC ......... *H04N 19/176* (2014.11); *H04N 19/436* (2014.11); *A63F 13/86* (2014.09)

(56) References Cited

U.S. PATENT DOCUMENTS

| | | | |
|---|---|---|---|
| 9,779,469 B2 | 10/2017 | Howes et al. | |
| 10,650,566 B2 | 5/2020 | Nevraev et al. | |
| 10,821,359 B2 | 11/2020 | Aronzon | |
| 2006/0004874 A1 | 1/2006 | Hutcheson et al. | |
| 2008/0055463 A1 | 3/2008 | Lerner et al. | |
| 2008/0165843 A1* | 7/2008 | Dvir | H04N 19/42 375/E7.093 |
| 2010/0167816 A1 | 7/2010 | Perlman et al. | |
| 2011/0110376 A1 | 5/2011 | Jiang | |
| 2012/0122577 A1 | 5/2012 | Aronzon | |
| 2012/0195382 A1* | 8/2012 | Zhang | H04N 19/436 375/240.24 |
| 2012/0215975 A1 | 8/2012 | Catrouillet et al. | |
| 2012/0299938 A1 | 11/2012 | Iwasaki | |
| 2013/0101035 A1* | 4/2013 | Wang | H04N 19/174 375/E7.243 |
| 2014/0228108 A1 | 8/2014 | Bruno et al. | |
| 2014/0304481 A1 | 10/2014 | Iwasaki | |
| 2015/0109310 A1* | 4/2015 | Ayanam | G06T 1/60 345/505 |
| 2015/0215631 A1* | 7/2015 | Zhou | H04N 19/436 375/240.02 |
| 2016/0043739 A1 | 2/2016 | Taylor | |
| 2016/0188453 A1 | 6/2016 | Chu et al. | |
| 2018/0293362 A1* | 10/2018 | Ray | H04N 19/00 |
| 2018/0293776 A1* | 10/2018 | Ray | G06F 12/0842 |
| 2019/0151755 A1 | 5/2019 | Aronzon | |
| 2020/0267386 A1* | 8/2020 | Chen | G06T 1/60 |
| 2020/0296422 A1* | 9/2020 | Zhu | H04N 19/45 |

FOREIGN PATENT DOCUMENTS

| | | | |
|---|---|---|---|
| CN | 102441276 A | 5/2012 | |
| CN | 102789305 A | 11/2012 | |
| CN | 104991827 A | 10/2015 | |
| CN | 105933727 A | 9/2016 | |
| CN | 107096221 A | 8/2017 | |
| CN | 107949823 A | 4/2018 | |
| JP | 2007336260 A | 12/2007 | |
| JP | 2015033051 A | 2/2015 | |
| KR | 10-2004-0091599 A | 10/2004 | |
| KR | 10-1036421 B1 | 9/2009 | |
| KR | 10-2011-0132609 A | 12/2011 | |
| KR | 10-2015-0092440 A | 8/2015 | |
| WO | 2013069655 A1 | 5/2013 | |
| WO | 2014179595 A1 | 11/2014 | |
| WO | 2017189321 A1 | 11/2017 | |

OTHER PUBLICATIONS

Translation of Korean Notice of Allowance issued Oct. 19, 2023 for Korean patent Application No. 10-2022-7006647, 4 pages.

Non-Final Office Action mailed Nov. 17, 2023 for U.S. Appl. No. 18/081,931, 11 pages.

Final Office Action mailed Nov. 24, 2023 for U.S. Appl. No. 17/402,761, 21 pages.

Non-Final Office Action mailed Apr. 19, 2024 for U.S. Appl. No. 17/868,160, 53 pages.

Translation of Chinese Office Action mailed Apr. 10, 2024 for CN Application No. 201980006052.0, 13 pages.

Translation of Chinese Office Action mailed Jul. 25, 2024 for CN Application No. 201980006039.5, 15 pages.

Translation of Notification for Patent Registration Formalities mailed Aug. 19, 2024 for CN Application No. 201980006052.0, 6 pages.

Notice of Allowance mailed Sep. 5, 2024 for U.S. Appl. No. 17/868,160, 31 pages.

Translation of Chinese Office Action mailed May 27, 2024 for CN Application No. 201980036500.1, 16 pages.

Notice of Allowance mailed Oct. 9, 2024 for U.S. Appl. No. 18/081,931, 64 pages.

Translation of Korean Office Action mailed Feb. 17, 2024 for KR Application No. 10-2023-7042902, 6 pages.

Translation of Chinese Office Action mailed Jan. 31, 2024 for CN Application No. 201980006039.5, 18 pages.

Extended European Search Report mailed Mar. 5, 2024 for EP Application No. 24157044.9, 11 pages.

Final Office Action mailed Mar. 29, 2024 for U.S. Appl. No. 18/081,931, 19 pages.

Corrected Notice of Allowability mailed Apr. 24, 2023 for U.S. Appl. No. 17/223,226, 7 pages.

Corrected Notice of Allowability mailed Apr. 28, 2023 for U.S. Appl. No. 15/734,275, 10 pages.

Non-Final Office Action mailed May 12, 2023 for U.S. Appl. No. 17/402,761, 37 pages.

Notice of Allowance mailed Apr. 28, 2023 for EP Application No. 21169156.3, 97 pages.

Notice of Allowance mailed Mar. 7, 2023 for EP Application No. 18797260.9, 118 pages.

Notice of Allowance mailed Jun. 7, 2023 for U.S. Appl. No. 17/216,115, 70 pages.

Supplemental Notice of Allowability mailed May 16, 2023 for U.S. Appl. No. 17/521,133, 6 pages.

Translation of First Office Action mailed Dec. 6, 2023 for CN Application No. 202210695936.5, 13 pages.

Extended European Search Report mailed Nov. 22, 2023 for EP Application No. 23193975.2, 12 pages.

European Notice of Allowance mailed Jan. 8, 2024 for EP Application No. 19714045.2, 110 pages.

Translation of Indian Notice of Grant and Report on Accumulated Annuities issued Dec. 8, 2023 for IN Application No. 202047027952, 4 pages.

Corrected Notice of Allowability mailed Nov. 6, 2024 for U.S. Appl. No. 18/081,931, 56 pages.

Notice of Allowance mailed Jan. 31, 2025 for U.S. Appl. No. 17/868,160, 21 pages.

Japanese Office Action mailed Feb. 4, 2025 for JP Application No. 2023184512, 5 pages.

Machine Translation of Japanese Decision of Refusal and Decision of Dismissal of Amendment mailed Oct. 7, 2025 for JP Application No. 2024-108770, 6 pages.

Notice of Allowance mailed Oct. 24, 2025 for U.S. Appl. No. 18/243,291, 32 pages.

Notice of Allowance mailed Aug. 15, 2025 for U.S. Appl. No. 18/243,291, 39 pages.

Communication under Rule 71(3) EPC mailed Feb. 16, 2026 for EP Application No. 24157044.9, 92 pages.

Machine Translation of Reconsideration Report by Examiner before Appeal mailed Apr. 7, 2026 for JP Application No. 2024-108770, 3 pages.

* cited by examiner

Gaming
Platform
150

Client Devices 102 and 104

Communication Network(s)
112

Server System 114

(e.g., H.264)

(e.g.,
H.264, VP9)

Frontend Server
134

Content
Server(s) 136

Game Server 122

CPU 138

GPU
140

Encoder
142

Memory 146

Data
Buffer
144

Media
Streaming
Server 124

User
Information
126

Session
Data (e.g.,
for session
116) 128

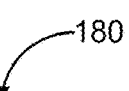

—180

| |
|---|
| Execute an online gaming application for displaying a gaming user interface on a first client device (e.g., a TV) and accepting a user selection of subscription of gaming service |

—152

| |
|---|
| Receive user information for registering free trial service or a subscription |

—154

| |
|---|
| Browse through a series of rich "hubs" for each content domain (also called content franchise), featuring game content, add-on content, live events, etc. |

—156

| |
|---|
| Receive a user selection of a game (e.g., a live football game), and load the game (i.e., starting a first gaming session) for display within a predetermined delay time |

—158

| |
|---|
| In response to a user action, provide live streams (e.g., keeping a first gaming stream on the first gaming session of the first client device, and broadcasting a second live review stream to one or more other client devices), wherein the second live stream allows the user to share gaming experience with audience |

—160

| |
|---|
| In response to a user action to pause the first game session, suspend the first game stream of the first gaming session executed on the first client device, and restart the first game stream on a second gaming session of a second client device to continue the first game session |

Media Device
106

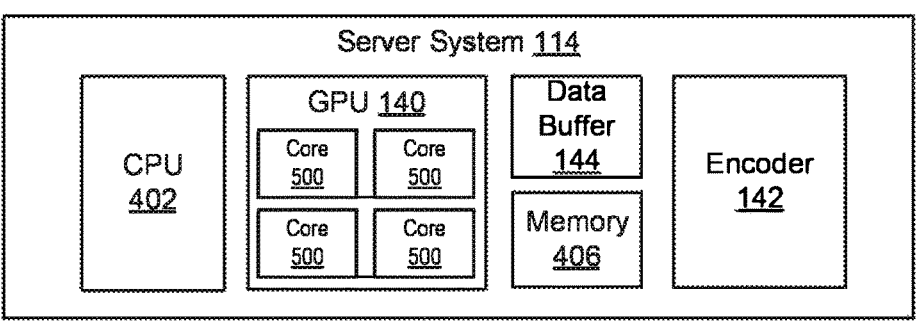
Figure 5A
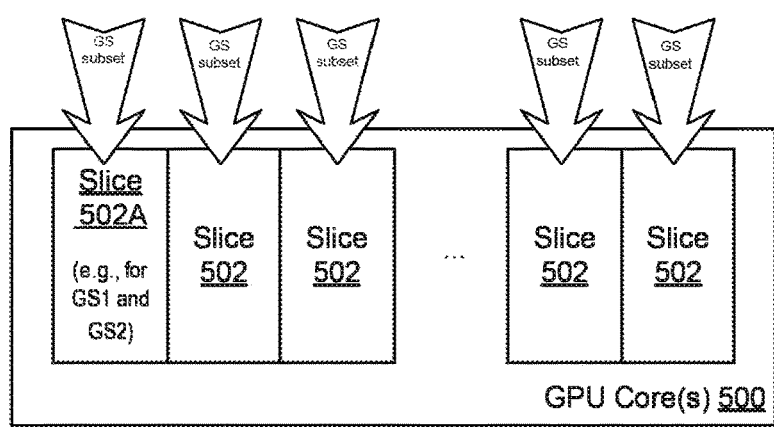
Figure 5B
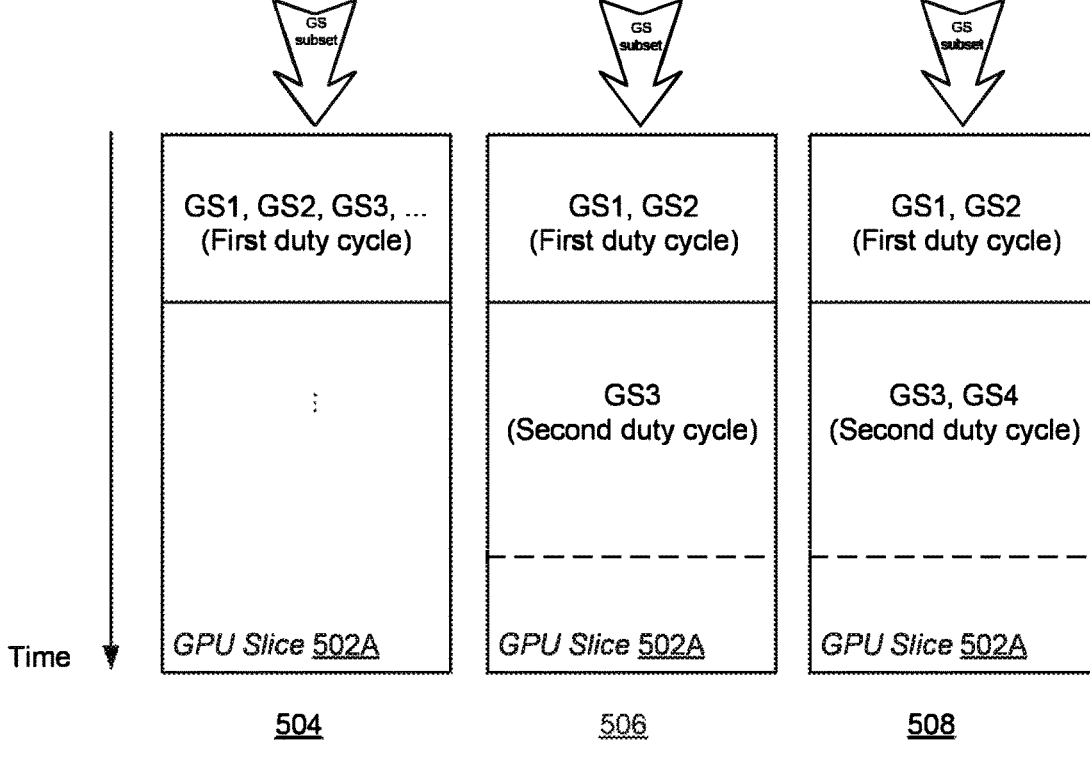
504                  506                  508
Figure 5C      Figure 5D      Figure 5E

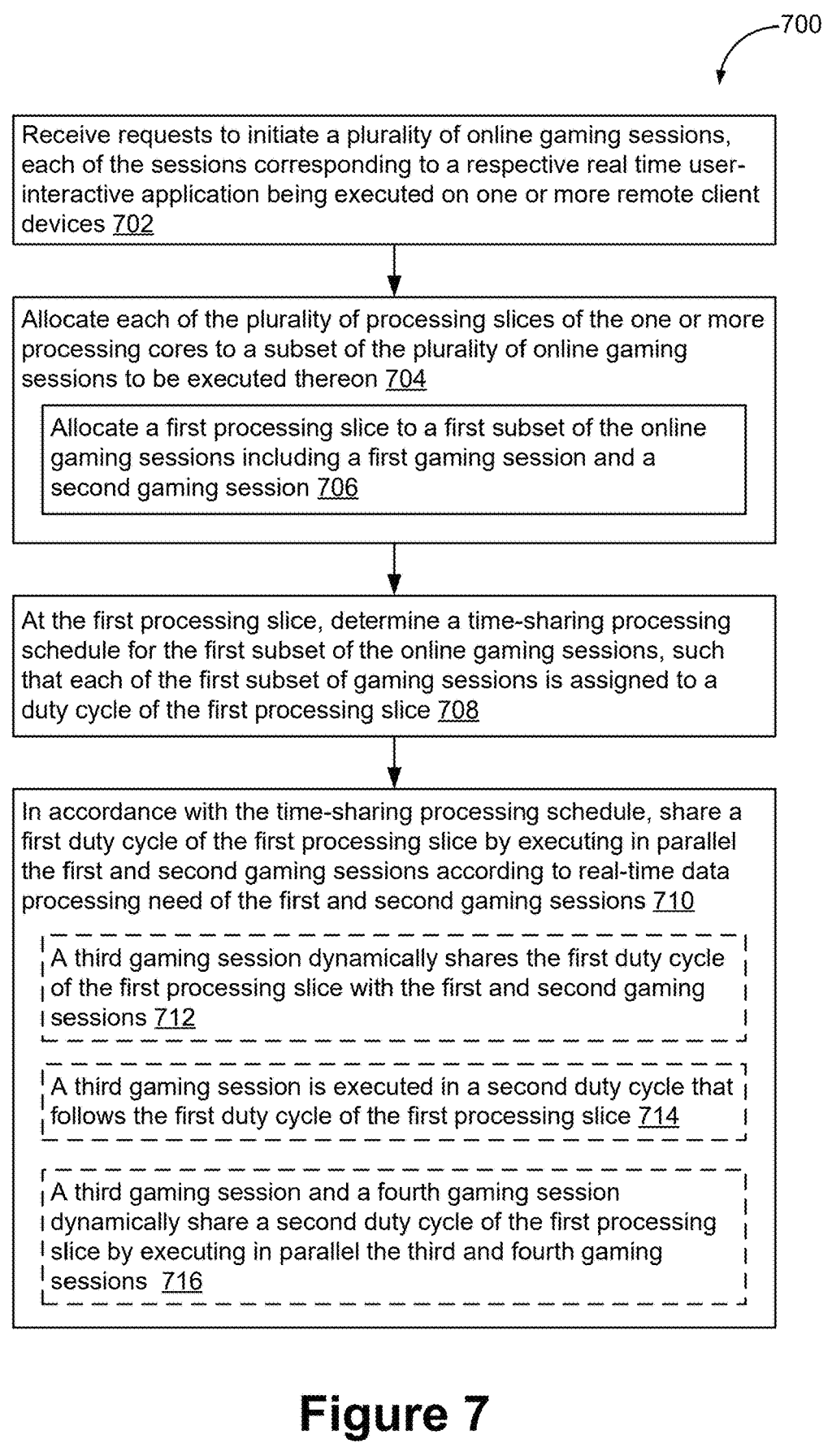

—700

Receive requests to initiate a plurality of online gaming sessions, each of the sessions corresponding to a respective real time user-interactive application being executed on one or more remote client devices 702

Allocate each of the plurality of processing slices of the one or more processing cores to a subset of the plurality of online gaming sessions to be executed thereon 704

Allocate a first processing slice to a first subset of the online gaming sessions including a first gaming session and a second gaming session 706

At the first processing slice, determine a time-sharing processing schedule for the first subset of the online gaming sessions, such that each of the first subset of gaming sessions is assigned to a duty cycle of the first processing slice 708

In accordance with the time-sharing processing schedule, share a first duty cycle of the first processing slice by executing in parallel the first and second gaming sessions according to real-time data processing need of the first and second gaming sessions 710

A third gaming session dynamically shares the first duty cycle of the first processing slice with the first and second gaming sessions 712

A third gaming session is executed in a second duty cycle that follows the first duty cycle of the first processing slice 714

A third gaming session and a fourth gaming session dynamically share a second duty cycle of the first processing slice by executing in parallel the third and fourth gaming sessions 716

Figure 7

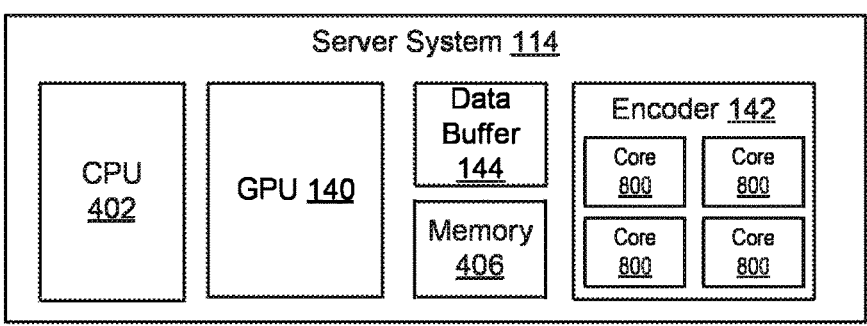
Figure 8A
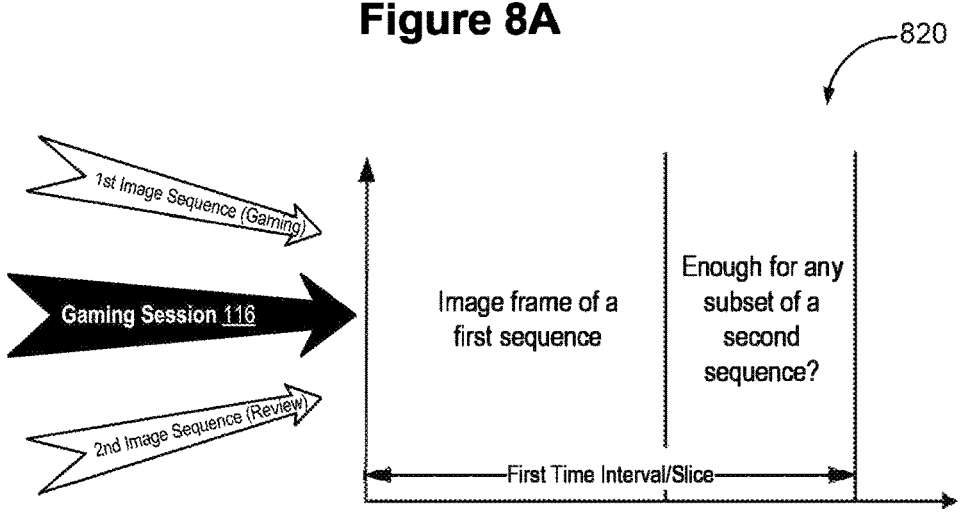
Figure 8B
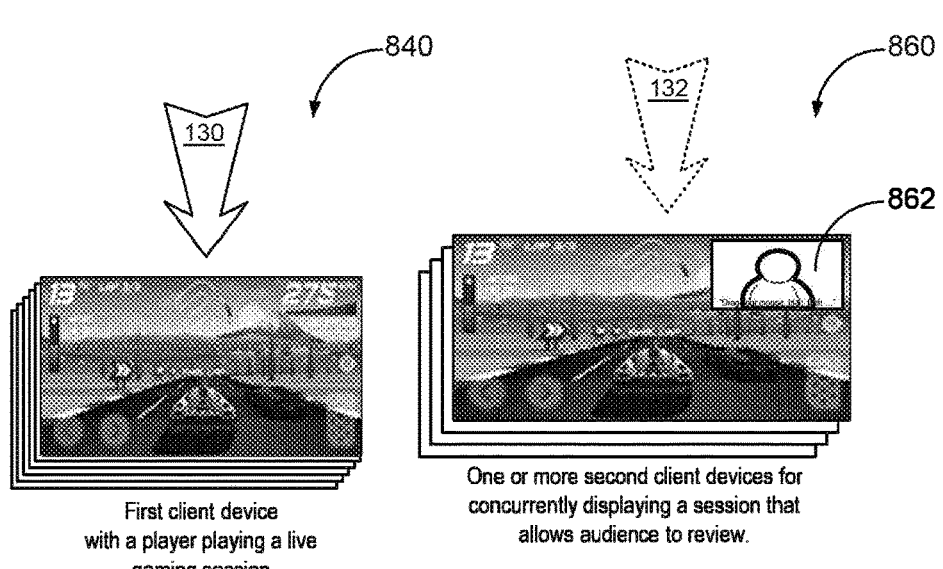
Figure 8C          Figure 8D

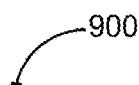

Generate by the encoder a plurality of media streams including a low latency stream and a normal latency stream, wherein the low latency stream corresponds to an online interactive session, and has a faster response rate and lower transmission latency than the normal latency stream 902

Identify a predefined frame rate for encoding a sequence of image frames of the low latency stream 904

For each image frame in the first sequence of image frames of the low latency stream:

Determine a first time interval corresponding to the predefined frame rate 906

Encode the image frame during the first time interval 908

After encoding the image frame, determining a remaining time left in the first time interval 910

In accordance with a determination that the remaining time left in the first time interval satisfies a normal latency requirement associated with the normal latency stream, generating a subset of the second sequence of image frames of the normal latency stream during the remaining time of the first time interval 912

In accordance with a determination that the remaining time left in the first time interval does not satisfy the normal latency requirement, aborting generating any image frame of the second sequence of image frames during the remaining time of the first time interval 914

Figure 9

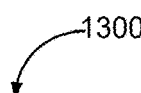

1300

Identify by the encoder cores frame data of an image frame associated with an online gaming session and stored in the data buffer <u>1302</u>

Allocate the plurality of encoder cores to process a plurality of image tiles of the frame data simultaneously and in parallel, the plurality of image tiles being defined in accordance with a rendering specification <u>1304</u>

The plurality of image tiles includes a first image tile assigned to a first encoder core, and the first image tile includes a first sequence of blocks <u>1306</u>

At the first encoder core:

Obtain from the data buffer a first block of the first sequence of blocks of the first image tile assigned to the first encoder core <u>1308</u>

Obtain boundary information of the first block <u>1310</u>

While or prior to obtaining from the data buffer a second block that follows the first block in the first sequence of blocks, encode the first block of the first sequence of blocks based on the boundary information <u>1312</u>

Transmit the encoded first block to a client device of a user associated with the online gaming session <u>1314</u>

Figure 13

METHODS AND SYSTEMS FOR RENDERING AND ENCODING CONTENT FOR ONLINE INTERACTIVE SESSIONS

CROSS-REFERENCE TO RELATED APPLICATIONS

The present application is a continuation application of U.S. patent application Ser. No. 17/521,133, entitled "METHODS AND SYSTEMS FOR RENDERING AND ENCODING CONTENT FOR ONLINE INTERACTIVE GAMING SESSIONS" and filed on Nov. 8, 2021, which is a continuation of U.S. patent application Ser. No. 16/849,805, entitled "METHODS AND SYSTEMS FOR RENDERING AND ENCODING CONTENT FOR ONLINE INTERACTIVE GAMING SESSIONS" and filed on Apr. 15, 2020, which is a continuation of International Application Serial No. PCT/US19/20935, entitled "METHODS AND SYSTEMS FOR RENDERING AND ENCODING CONTENT FOR ONLINE INTERACTIVE GAMING SESSIONS" and filed on Mar. 6, 2019, which claims priority to U.S. Provisional Patent Application Ser. No. 62/646,824, entitled "METHODS AND SYSTEMS FOR RENDERING AND ENCODING CONTENT FOR ONLINE INTERACTIVE GAMING SESSIONS" and filed on Mar. 22, 2018, the entirety of which is incorporated by reference herein.

RELATED APPLICATIONS

This application claims priority to and is a continuation of PCT Patent Application No. PCT/US19/20935, titled "Methods and Systems for Rendering and Encoding Content for Online Interactive Gaming Sessions," filed on Mar. 6, 2019, which claims priority to U.S. Provisional Patent Application No. 62/646,824, titled "Methods and Systems for Rendering and Encoding Content for Online Interactive Gaming Sessions," filed on Mar. 22, 2018, each of which is incorporated by reference herein in its entirety.

This application is related to International Patent Application. PCT/US 18/55055, titled "Distributed Sample-Based Game Profiling with Game Metadata and Metrics and Gaming API Platform Supporting Third-Party Content," filed Oct. 9, 2018, which claims priority to U.S. Provisional Patent Application No. 62/570,648, titled "Gaming API Platform Supporting Third-Party Content," filed on Oct. 10, 2017, each of which is incorporated by reference herein in its entirety.

This application is related to U.S. patent application Ser. No. 15/599,408, titled "Method and Systems for Facilitating Participation in a Game Session," filed May 18, 2017, which claims the benefit of U.S. Provisional Patent Application No. 62/339,052, titled "Method and Systems for Facilitating Participation in a Game Session," filed May 19, 2016, each of which is incorporated by reference herein in its entirety.

This application is also related to U.S. patent application Ser. No. 15/851,610 titled "Network Impairment Simulation Framework for Verification of Real Time Interactive Media Streaming Systems," filed Dec. 21, 2017, which is incorporated by reference herein in its entirety.

TECHNICAL FIELD

This application relates generally to computer technology, including but not limited to methods and systems for managing a server system to support online interactive sessions corresponding to one or more real time user-interactive applications.

BACKGROUND

Internet-connected electronic devices can support a variety of cloud-based media and entertainment applications. These applications include media streaming applications in which a server streams content to user devices, gaming applications in which a user interacts from a user device with a game that executes on a server, and a variety of social media and communication applications that allow large numbers of users to interact concurrently with each other and with cloud-hosted content and applications via their Internet-connected devices. Among cloud-based applications, cloud gaming presents some unique challenges due to: the widely varying hardware demands of gaming titles: the diverse topologies in which cloud-based games can be played (e.g., by a single player, by multiple players in a single location, or by multiple players in multiple locations): the need to transmit reliably and without latency player inputs to a gaming server that executes a gaming session and gaming session outputs from the gaming server to the players' devices/displays: widely varying player expectations as to speed and responsiveness of gameplay; and the desire in some situations to provide near-real time gaming content to spectators. Other challenges of cloud based gaming relate to providing a consistent gameplay experience for players regardless of where they are located (e.g., close or far from the server), how they connect to the gaming service (e.g., via a fast or slow Internet connection), and what type of device(s) they use to play the game (e.g., a generic personal device or a dedicated game controller) and view gameplay outputs (e.g., a personal device or a media device connected to a media streaming device).

Specifically, there is a need for a cloud gaming system that support multiple gaming sessions for multiple gaming titles, where the games can execute concurrently with acceptable latency and responsiveness, including for multiple players who are playing the same game title from the same or different locations, with a wide variety of input and output devices and network connections. In addition, there is a need for a cloud gaming system that, upon receiving a player input (e.g., a gaming input entered on an end use gaming device/controller) in a gaming session, processes the user input promptly and outputs high-definition images reflecting the outcome of the player input action for all of the game players simultaneously and with acceptable latency. There is also a need for a gaming system that, in some situations, provides a high definition video stream of gameplay activity to allow spectators to follow the gameplay in real time on the respective display devices. As such, it would be beneficial to provide a cloud gaming system with efficient game processing and output mechanisms to expand gaming experience in a wide range of gaming settings, from spontaneous gameplay by users gathered in the same location to online interactive gameplay by multiple users from different locations.

SUMMARY

Implementations described in this specification are directed to providing a gaming application programming interface (API) and cloud platform to enable efficient, portable, and low latency hosting of gaming content. Some implementations dynamically allocate cloud gaming hardware resources, and monitor and utilize network bandwidth available to individual end users to provide an optimal cloud gaming experience. Some implementations provide multiple performance tiers, including a tier that supports high performance, real time gaming sessions with high definition media output and end user streams. Some implementations support different subscription models and/or are configured to provide one or more concurrent real time gameplay and/or review media streams that correspond with little or no latency to one or more actual gaming streams (e.g., a video stream output to a client device of a user participating in an online/cloud gaming session via either a mobile app or a browser-based program). In some implementations, concurrent gameplay and/or review videos are provided with little or no latency via a media streaming site, such as YouTube, to one or more users.

In one aspect of the application, a method of managing processing capability is implemented at a server system that includes one or more processing cores (e.g., graphics processing unit "GPU" cores) and memory storing programs for execution by the processing cores. In some implementations, the one or more processing cores include (e.g., provide) a plurality of processing slices, each of which is configured to execute one or more online gaming sessions. The method includes receiving requests to initiate a plurality of online gaming sessions, wherein each of the sessions corresponds to a respective real time user-interactive application being executed on one or more remote client devices. The method further includes allocating each of the plurality of processing slices of the one or more processing cores to a subset of the plurality of online gaming sessions to be executed thereon (e.g., executed by the respective processing slice on the corresponding one or more processing cores), including allocating a first processing slice to a first subset of the online gaming sessions including a first gaming session and a second gaming session. The method further includes at the first processing slice, determining a time-sharing processing schedule for the first subset of the online gaming sessions, such that each of the first subset of gaming sessions is assigned to a duty cycle of the first processing slice. The method further includes in accordance with the time-sharing processing schedule, sharing a first duty cycle of the first processing slice by executing in parallel the first and second gaming sessions according to real-time data processing need of the first and second gaming sessions. Optionally, the first processing slice comprises only the first duty cycle and no further duty cycle. Alternatively, it comprises at least a second duty cycle to be executed after the first duty cycle.

In another aspect, a corresponding server system is provided, comprising: one or more processing cores, wherein the one or more processing cores includes a plurality of processing slices; and memory storing one or more programs for execution by the one or more processing cores, the one or more programs comprising instructions for: receiving requests to initiate a plurality of online gaming sessions, each of the sessions corresponding to a respective real time user-interactive application being executed on one or more remote client devices: allocating each of the plurality of processing slices of the one or more processing cores to a subset of the plurality of online gaming sessions to be executed thereon, including allocating a first processing slice to a first subset of the online gaming sessions including a first gaming session and a second gaming session: at the first processing slice, determining a time-sharing processing schedule for the first subset of the online gaming sessions, such that each of the first subset of gaming sessions is assigned to a duty cycle of the first processing slice; and in accordance with the time-sharing processing schedule, sharing a first duty cycle of the first processing slice by executing in parallel the first and second gaming sessions according to real-time data processing need of the first and second gaming sessions.

In another aspect, a non-transitory computer readable medium storing one or more programs for execution by one or more processing cores of a server system is provided, wherein the one or more processing cores includes a plurality of processing slices, the one or more programs comprising instructions for: receiving requests to initiate a plurality of online gaming sessions, each of the sessions corresponding to a respective real time user-interactive application being executed on one or more remote client devices: allocating each of the plurality of processing slices of the one or more processing cores to a subset of the plurality of online gaming sessions to be executed thereon, including allocating a first processing slice to a first subset of the online gaming sessions including a first gaming session and a second gaming session: at the first processing slice, determining a time-sharing processing schedule for the first subset of the online gaming sessions, such that each of the first subset of gaming sessions is assigned to a duty cycle of the first processing slice; and in accordance with the time-sharing processing schedule, sharing a first duty cycle of the first processing slice by executing in parallel the first and second gaming sessions according to real-time data processing need of the first and second gaming sessions.

In another aspect, a method of providing media streams concurrently is implemented at a server system including a plurality of encoder cores and memory storing programs for execution by the encoder cores. The method includes generating by the encoder cores a plurality of media streams including a low latency stream and a normal latency stream. The low latency stream corresponds to an online interactive session, and has a faster response rate and lower transmission latency than the normal latency stream. The method further includes identifying a predefined frame rate for encoding a sequence of image frames of the low latency stream. The method further includes for each image frame in the first sequence of image frames of the low latency stream, determining a first time interval corresponding to the predefined frame rate, encoding the image frame during the first time interval, and determining a remaining time left in the first time interval after encoding the image frame. The method further includes in accordance with a determination that the remaining time left in the first time interval satisfies a normal latency requirement associated with the normal latency stream, generating a subset of the second sequence of image frames of the normal latency stream during the remaining time of the first time interval. The method further includes in accordance with a determination that the remaining time left in the first time interval does not satisfy the normal latency requirement, aborting generating any image frame of the second sequence of image frames during the remaining time of the first time interval.

In another aspect, a server system is provided, comprising: an encoder; and memory storing one or more programs for execution by the encoder, the one or more programs comprising instructions for: generating by the encoder a plurality of media streams including a low latency stream and a normal latency stream, wherein the low latency stream corresponds to an online interactive session, and has a faster response rate and lower transmission latency than the normal latency stream, including: identifying a predefined frame rate for encoding a sequence of image frames of the low latency stream: for each image frame in the first sequence of image frames of the low latency stream: determining a first time interval corresponding to the predefined frame rate: encoding the image frame during the first time interval: after encoding the image frame, determining a remaining time left in the first time interval; in accordance with a determination that the remaining time left in the first time interval satisfies a normal latency requirement associated with the normal latency stream, generating a subset of the second sequence of image frames of the normal latency stream during the remaining time of the first time interval; and in accordance with a determination that the remaining time left in the first time interval does not satisfy the normal latency requirement, aborting generating any image frame of the second sequence of image frames during the remaining time of the first time interval.

In another aspect, a non-transitory computer readable medium storing one or more programs for execution by an encoder of a server system is provided, the one or more programs comprising instructions for: generating by the encoder a plurality of media streams including a low latency stream and a normal latency stream, wherein the low latency stream corresponds to an online interactive session, and has a faster response rate and lower transmission latency than the normal latency stream, including: identifying a predefined frame rate for encoding a sequence of image frames of the low latency stream: for each image frame in the first sequence of image frames of the low latency stream: determining a first time interval corresponding to the predefined frame rate: encoding the image frame during the first time interval: after encoding the image frame, determining a remaining time left in the first time interval: in accordance with a determination that the remaining time left in the first time interval satisfies a normal latency requirement associated with the normal latency stream, generating a subset of the second sequence of image frames of the normal latency stream during the remaining time of the first time interval; and in accordance with a determination that the remaining time left in the first time interval does not satisfy the normal latency requirement, aborting generating any image frame of the second sequence of image frames during the remaining time of the first time interval.

In yet another aspect, a method of encoding a media stream is implemented at a server system including a GPU, a plurality of encoder cores, a data buffer, and memory storing programs for execution by the GPU and the encoder cores. The method includes identifying by the plurality of encoder cores frame data of an image frame associated with an online gaming session and stored in the data buffer, and allocating the plurality of encoder cores to process a plurality of image tiles of the frame data defined in accordance with a rendering specification simultaneously and in parallel. As an example, the rendering specification may define that (optionally, how) an image frame is partitioned. The plurality of image tiles includes a first image tile assigned to a first encoder core, and the first image tile includes a first sequence of blocks. The method further includes at the first encoder core, obtaining from the data buffer a first block of the first sequence of blocks of the first image tile assigned to the first encoder core, and obtaining boundary information of the first block. The method further includes while or prior to obtaining from the data buffer a second block that follows the first block in the first sequence of blocks, encoding the first block of the first sequence of blocks based on the boundary information. The method further includes transmitting the encoded first block to a client device of a user associated with the online gaming session.

In another aspect, a server system is provided, comprising: a GPU, a plurality of encoder cores, a data buffer, and memory storing one or more programs for execution by the GPU and encoder cores, the one or more programs comprising instructions for: identifying by the encoder cores frame data of an image frame associated with an online gaming session and stored in the data buffer: allocating the plurality of encoder cores to process a plurality of image tiles of the frame data defined in accordance with a rendering specification simultaneously and in parallel, wherein the plurality of image tiles includes a first image tile assigned to a first encoder core, and the first image tile includes a first sequence of blocks, including: at the first encoder core: obtaining from the data buffer a first block of the first sequence of blocks of the first image tile assigned to the first encoder core: obtaining boundary information of the first block: while or prior to obtaining from the data buffer a second block that follows the first block in the first sequence of blocks, encoding the first block of the first sequence of blocks based on the boundary information; and transmitting the encoded first block to a client device of a user associated with the online gaming session.

In another aspect, a non-transitory computer readable medium storing one or more programs for execution by a server system is provided, wherein the server system further includes a GPU, a plurality of encoder cores and a data buffer, the one or more programs comprising instructions for: identifying by the encoder cores frame data of an image frame associated with an online gaming session and stored in the data buffer: allocating the plurality of encoder cores to process a plurality of image tiles of the frame data defined in accordance with a rendering specification simultaneously and in parallel, wherein the plurality of image tiles includes a first image tile assigned to a first encoder core, and the first image tile includes a first sequence of blocks, including: at the first encoder core: obtaining from the data buffer a first block of the first sequence of blocks of the first image tile assigned to the first encoder core: obtaining boundary information of the first block: while or prior to obtaining from the data buffer a second block that follows the first block in the first sequence of blocks, encoding the first block of the first sequence of blocks based on the boundary information; and transmitting the encoded first block to a client device of a user associated with the online gaming session.

In yet another aspect, a method of rendering online interactive gaming sessions is implemented at a server system that includes a plurality of processing cores and memory storing programs for execution by the processing cores. The method includes receiving a user command from a first user associated with an online gaming session. The method further includes determining a type of the command and an expected response latency associated with the type of the command, a roundtrip communication latency between a client device of the first user by which the user is participating in the online gaming session and the server, a processing latency associated with performing the user command on the server, and an actual transmission latency based on the roundtrip communication latency and the processing latency. The method further includes executing the command in the online gaming session at least by generating one or more intermediate frames and a first frame reflecting an initial result of the command. The one or more intermediate frames when transmitted at a predefined frame rate occupy a transmission time corresponding to the actual transmission latency. The method further includes transmitting at the predefined frame rate the one or more intermediate frames followed by the first frame such that the first frame is received at a client device of the first user at a time corresponding to the expected response latency.

In yet another aspect, a method of allocating resources is implemented at a server system comprising a plurality of virtual machines each of which has a respective resource profile. The method includes receiving a request from a computing device to establish a real-time interactive session, and the request is received through a network connection with the computing device. The method further includes determining a device capability of the computing device, determining a connection capability of the network connection, and determining one or more target quality parameters for the real-time interactive session based on the device capability and the connection capability. The method further includes based on the determined one or more target quality parameters, associating a first virtual machine of the plurality of virtual machines with the real-time interactive session, and establishing the real-time interactive session in accordance with the association of the first virtual machine to the real-time interactive session. The method further includes providing to the real-time interactive session, in accordance with the resource profile of the first virtual machine, resources for processing inputs and generating outputs within the real-time interactive session.

In accordance with some aspects of this application, a server system includes memory storing instructions for causing the server system to perform any of the methods described above.

Further, in accordance with some aspects of this application, instructions stored in memory of a server system include instructions for causing the server system to perform any of the methods described above.

Other embodiments and advantages may be apparent to those skilled in the art in light of the descriptions and drawings in this specification.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIG. 1C is an example flow chart of a method 180 of executing a gaming session on a gaming platform 150 shown in FIG. 1B in accordance with some implementations.

FIG. 5A is a block diagram of an example server system including at least a GPU in accordance with some implementations. FIG. 5B is a block diagram of GPU cores that are partitioned to a plurality of processing slices in accordance with some implementations. FIGS. 5C-5E are example processes during which two or more gaming sessions are allocated to a processing slice in accordance with some implementations.

FIG. 7 is a flow diagram illustrating an example method for managing processing capability of a server system in accordance with some implementations.

FIG. 8A is a block diagram of an example server system including at least an encoder in accordance with some implementations. FIG. 8B is a time diagram of a time interval in accordance with some implementations. FIGS. 8C and 8D are example images of two distinct media streams that are concurrently displayed at two separate client devices in association with a game scene in accordance with some implementations.

FIG. 9 is a flow diagram illustrating an example method for providing media streams concurrently in accordance with some implementations.

FIG. 13 is a flow diagram illustrating an example method for encoding a media stream in accordance with some implementations.

Like reference numerals refer to corresponding parts throughout the drawings.

DESCRIPTION OF IMPLEMENTATIONS

Figure 1A:
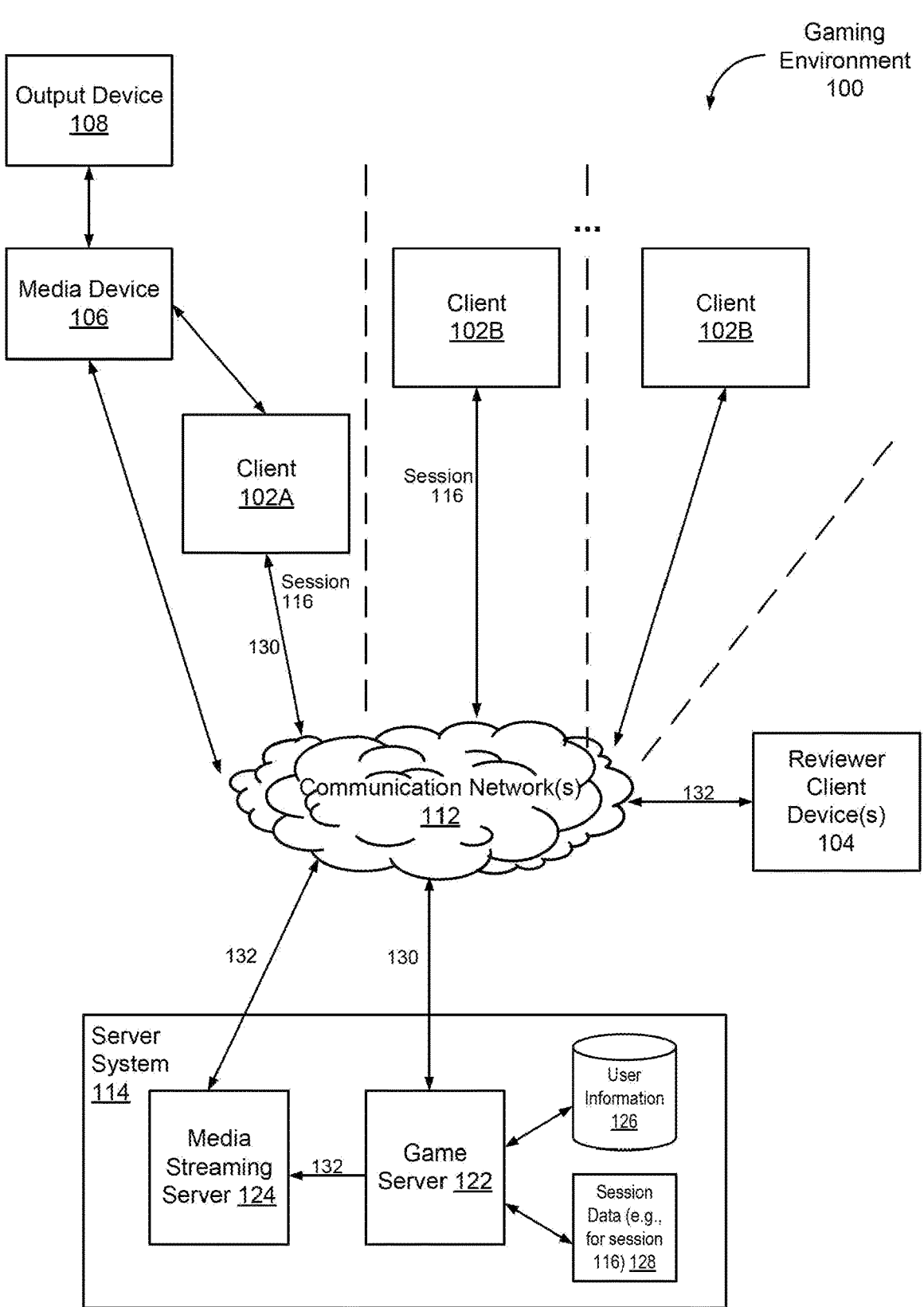
FIG. 1A is an example online interactive gaming environment 100 in accordance with some implementations.

Implementations described in this specification are directed to providing a cloud platform and an API to enable efficient, portable, low latency hosting of cloud gaming content, including third party gaming content. Some implementations dynamically allocate cloud gaming hardware resources (e.g., CPUs, GPUs, memory, input/output, and video stream encoders) and monitor and utilize network bandwidth available to individual end users to provide an optimal online gaming experience concurrently to a community of game players. Some implementations provide multiple performance tiers, including a tier that supports high performance, real-time gaming sessions with high definition media streams for end users. Some implementations support different subscription models and/or are configured to provide one or more concurrent real time gameplay and/or review media streams that correspond with little or no latency to one or more actual gaming streams (e.g., a video stream output to a client device of a user participating in an online/cloud gaming session via either a mobile application or a browser-based program). In some implementations, the real-time gameplay and/or review media streams are provided with little or no latency via a media streaming site, such as YouTube, to one or more users.

In some implementations of a cloud gaming environment, a server system provides hardware resources for a real-time, interactive gaming session for processing player inputs and generating output streams for display to one or more players and, optionally, gaming spectators. In response to a request to establish the real-time interactive gaming session, the server system determines a device capability (e.g., hardware and/or software capabilities) of the requesting client device (i.e., the player's controller device), a connection capability (e.g., bandwidth, latency and/or error rate) of a network connection, and one or more target quality parameters of the gaming session (e.g., resolution of the output video stream(s), gaming response latency, etc.), and accordingly, associates one of its virtual machines with the real-time interactive session for establishing the session.

In some implementations, processing and encoding capability of gaming data (e.g., to produce output video streams for players and/or spectators) are managed for one or more processing cores (e.g., GPU cores and encoder cores) in the server system that hosts the real-time, online, and interactive gaming environment. For example, in some implementations, the one or more processing cores operate with a plurality of processing slices (e.g., each executing on a processing core for a time period, in particular for a predetermined time period, e.g. 16.67 ms). The server system may allocate each of the plurality of processing slices to a subset of a plurality of online gaming sessions to be executed thereon. For one of the processing slices, the server system determines a time-sharing processing schedule, such that a corresponding subset of gaming sessions share a duty cycle of the processing slice, and are executed in parallel according to their respective real-time data processing need. Additionally, to expedite image encoding within a time interval, an encoder of the server system does not need to wait until a GPU has made available all data of an image frame. Rather, in some implementations, a portion of an image frame is encoded as soon as information required for encoding the portion is provided by the GPU, independently of whether other portions of the image frame that are irrelevant to the encoded portion are made available or not by the GPU.

In addition, the server system can dynamically generate a number of frames in response to a user command received from a user who plays an online gaming session. In accordance with a type of the user command, the server system determines an expected response latency, actual communication and processing latencies, and an actual transmission latency. Then, the user command is executed in the online gaming session by generating a set of frames reflecting an effect of the command. The set of frames when transmitted at a predefined frame rate occupy a transmission time corresponding to the actual transmission latency, and can be received at a client device of the user within a time corresponding to the expected response latency.

Figure 1B:
FIG. 1B is an example gaming platform 150 that manages third party content in accordance with some implementations.

FIG. 1A shown an example online interactive gaming environment 100 in accordance with some implementations. FIG. 1B shows an example gaming platform 150) that manages third party content in accordance with some implementations, and FIG. 1C is an example flow chart of a method 180 of executing a gaming session on a gaming platform 150 shown in FIG. 1B in accordance with some implementations. The online interactive gaming environment 100 includes one or more client devices (e.g., client devices 102 and 104). Each of the client devices 102 executes one or more end user game applications (e.g., a game controller application that allows a user to interact with a cloud gaming session that is executed on a remote server system). A game session can be run on a specific game application (sometimes referred to as a gaming title) to allow a user of the client device 102 to play an online interactive game hosted by a server system 114. In some implementations, the client device 102 (e.g., a host client) is configured to invite one or more other client devices 102 to join a game scene of the specific game application. Gaming sessions of these client devices 102 are synchronized to display the same game scene, optionally with distinct perspectives corresponding to their respective users.

Conversely, the server system 114 hosts an online interactive game platform to support the client devices 102 to play the one or more game applications including the specific game application. Specifically, the server system 114 includes a plurality of user accounts associated with the client devices 102, and authenticates the users of the client devices in association with each of the one or more game applications. The server system 114 renders and refreshes a scene of the online interactive game on the client devices 102 that join corresponding gaming sessions associated with the scene. In some implementations, the server system 114 may assess the capabilities of the client devices 102 and/or a quality of the communicative connection between the server system 114 and each of the client devices 102, and adaptively generates synchronous data streams for the gaming sessions associated with the client devices 102. By these means, the server system 114 is configured to facilitate synchronous gaming sessions of an online interactive game on two or more client devices 102 simultaneously and with substantially low latencies.

In some implementations, the server system 114 includes a game server 122 and a media streaming server 124. The game server 122 is configured to provide two or more media streams concurrently for an online interactive game session running on a first client device 102A. The two or more media streams include a low latency stream and a normal latency stream that are provided to the first client device 102A and a reviewer client device 104 via one or more communication network 112, respectively. Optionally, the normal latency stream is provided for instructional purposes. While a user the first client device 102 plays the game session on the first client device 102A, the game session is recorded and broadcast to one or more spectators via the normal latency stream, i.e., the spectators can review the game session on the reviewer client device 104. The low latency stream corresponds to gameplay of the online interactive game session, and has a faster response rate and lower transmission latency than the normal latency stream that corresponds to an associated review session. For example, the low latency stream has a predefined frame rate of 60 frames per second (fps), and provides at least one frame to the first client device 102A during each time interval of 16.67 ms, and the normal latency stream has a predefined frame rate of 30 fps, and provides at least one frame to the reviewer client device 104 during each time interval of 33.33 ms. In some implementations, the normal latency stream has a lower resolution than that of the low latency stream.

In some implementations, a client device 102 or 104 has a display screen integrated therein for displaying media content. In some implementations, a client device 102 or 104 is coupled to a media device 106 and an output device 108. Specifically, the client device 102 or 104 can be communicatively coupled to the media device 106 directly (e.g., via Bluetooth or other wireless communication links), via a local network (e.g., a Wi-Fi network), or via one or more communication networks 112. In some implementations, the client device (102 or 104) and the media device 106 are local to each other (e.g., in the same room, in the same house, etc.). The media device 106 is further coupled to one or more output devices 108 that can output visual and/or audio content (e.g., a television, a display monitor, a sound system, speakers, etc.). The media device 106 is configured to output content to the output device(s) 108. In some implementations, the media device 106 is a casting device (e.g., CHROMECAST by Google Inc.) or a device that otherwise includes casting functionality.

Each client device 102 or 104 is capable of data communication and information sharing with each other, a central server or cloud-computing system (e.g., the server system 114), and/or other devices (e.g., another client device 102 or 104, a media device 106 and an output device 108) that are network-connected. Data communication may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document. In some embodiments, the online interactive gaming environment 100 includes a conventional network device (e.g., a router) via which a set of client devices 102 and 104 and their corresponding media and output devices (if any) are communicatively coupled to each other on a local area network, and the local area network is communicatively coupled to other part of the communication networks 112 (e.g., wide-area networks and the Internet). In some embodiments, each of the client devices 102 and 104 optionally communicates with one or more other client devices, a respective media device 106, or a respective output device 108 using one or more radio communication networks (e.g., ZigBee, Z-Wave, Insteon, Bluetooth, Wi-Fi, and/or other radio communication networks).

In some implementations, the client devices 102 are remote from each other, i.e., they are not located in the same room or even structure. A game may be started by launching a game application (e.g., game application 228, FIG. 2) for execution at each client device 102. In some implementations, for each client device 102, the game application establishes an online gaming session 116 with the server system 114 independently. The online gaming sessions 116 of two or more client devices 102 (e.g., 102A and 102B) are related to each other (e.g., because they are played in the same game domain of the game application), and therefore, share a game scene in the game application. The related online gaming sessions 116 are synchronized with each other, and each online gaming session 116 optionally shows the same game scene with a unique player perspective corresponding to the respective client device 102. A user of each client device 102 can therefore play the game on the respective client device and influence the output from the online gaming sessions 116 on the other client device(s) 102.

Alternatively, in some other implementations, after the game application of a first client device 102A establishes an online gaming session 116, one or more second client devices 102B are invited to join the online gaming session 116 by an invitation message, and for example, a message with the link (e.g., a URL address) to join the online gaming session 116 is sent to each of the second client devices 102B. An appropriate controller configuration is provided to each second client device 102B that is invited to join the online gaming session 116. In this application, when the second clients 102B join an online gaming session 116, the server system 114 creates a separate gaming session 116 for each individual second client device 102B. Each separate gaming session 116 of the respective second client device 102B is synchronized with and shares the same scene with the gaming session 116 of the first client device 102A, but can have a unique player perspective corresponding to the respective second client device 102B. After each second client device 102B has received the appropriate controller configuration and joined the online gaming session 116 (more accurately, started its related online gaming session 116), a user can play the game on the respective second client device 102B and influence the output of the online gaming sessions 116 running on the other client device(s) 102.

The client device 102 is a device that includes, and can run, one or more distinct user applications including the game application. In some implementations, the client device 102 is a smartphone, a tablet device, a laptop computer, a desktop computer, or a multimedia device each of which is configured to run a game application (also called a controller application) for implementing an online gaming session. In some implementations, the client device 102 includes a specialized game controller that executes a game application (also called an end user game control application) that allows a user to interact with an online gaming session. In some implementations, the client device 102 includes one or more user applications that are configured to operate in conjunction with the media device 106. In some implementations, the applications include a media device application for pairing the client device 102 with the media device 106 and configuring the media device 106. The applications also include one or more applications that can cast associated content to the media device 106. In some implementations, an application casts data and/or content to the media device 106 by sending the data/content directly to the media device 106 (e.g., via the local network) and/or by directing the media device 106 to a remote location (e.g., a URL or other link to a location at a server system) from which the media device 106 can stream or otherwise receive data/content. The media device 106 receives data/content from the application and/or the remote location and outputs visual and/or audio content corresponding to the received data/content to the output device 108. Thus, an online gaming session 116 is established between the game application running on the client device 102, the remote server system 114, and the media device 106.

In some implementations, as part of the process of linking related online game sessions 116, the server system 114 assesses the capabilities of each corresponding client device 102 and/or a quality of the communicative connection between the server system 114 and the client device 102. In some implementations, the server system 114 measures network latency between the client device 102 and the server system 114. If the measured latency is above a threshold and a lower-latency connection is available, the server system 114 can suggest that the client device 102 change to the lower latency connection, or invite a user of the client device 102 to change the client device 102 to the lower latency connection. For example, if the client device 102 is on a cellular wireless connection, and a local network is available, the server system 114 can suggest that the client device 102 should connect through the available local network. In some implementations, the latency threshold requirements differ between games. For example, some games (e.g., action games) are best experienced on lower latency connections, and some other games (e.g., online board games or card games) are not as demanding with respect to latency. The server system 114 may make connection recommendations in view of these different requirements associated with different types of games.

As part of the client device 102 starting or joining the gaming session 116, the server system 114 communicates with the client device 102 to set up a controller on the client device 102. In some implementations, this includes the server system 114 assessing whether the client device 102 has the needed resources and communication capability for the controller. Depending on available resources at the client device 102, connection quality, and requirements for the game, the controller may be implemented differently at the client device 102. In some implementations, a game can be played with a webpage-based controller interface. For example, a controller interface for the game may be embedded in a webpage, and the webpage is rendered in a web browser on the client device 102. Alternatively, in some implementations, a standardized controller is implemented in a predefined application not specific to the game or directly associated with the game (e.g., a casting device application, such as CHROMECAST or GOOGLE CAST by Google Inc., or other media device application), or in the operating system of the client device 102. For example, the device operating system or a predefined application on the client device 102 may have a controller sub-module. The controller sub-module includes one or more standardized controller configurations, templates, or the like. Each of the standardized controller configurations configures the controller sub-module to utilize input devices and/or sensors on the client device 102 in some way to implement a virtual controller. The standardized controller configuration is used may vary with the game and/or with the type of client device.

Further, in some implementations, a game has a specific controller configuration that may be implemented on the controller sub-module. Such a configuration may be stored at the server system 114 and transmitted to the client devices 102, as part of the process of the client devices 102 joining or starting the online gaming session 116. In some implementations, a specific controller configuration can be an entirely custom controller or a mix of standard controller and a custom controller. Additionally, in some implementations, a game requires a specific application associated with the game. For example, a game may require a controller application associated specifically with the game. In some implementations, the client device 102 may be directed to download the specific application or the predefined application as part of starting or joining the session 116. For example, if the client device 102 does not already have the predefined application (with the controller sub-module) or the specific application associated with game, and such an application is required for play, the server system 114 instructs the client device 102 to prompt its user that a download is needed and to ask the user for permission to proceed.

The server system 114 stores at least user information 126 associated with user accounts of each of one or more game applications (e.g., game application 228, FIG. 2) that are hosted on the server system 114. Examples of the user information 126 include, but are not limited to, user account information (e.g., identification and passwords), membership type, preference, and activity history. In some implementations, the server system 114 stores session data 128 associated with the online gaming sessions that are played on the client devices 102. Examples of the session data 128 for each online gaming session 116 include, but are not limited to, a frame rate, a rendering specification, a normal latency requirement, information of GPU allocation, information of encoder allocation, identifications of related sessions, and latest status information. The session data 128 is accessed more frequently than the user information 126. In some implementations, memory storing the user information 126 and the session data 128 is made of a flash memory and random access memory (RAM), respectively.

In some implementations, creation of a real-time interactive gaming environment 100 requires hardware resources that are roughly proportional to a pixel resolution of a game scene to be rendered. A physical processor of the server system 114 may be virtualized to enable differing resource allocations according to a target resolution. Virtualization techniques is based on time-division multiplexing (TDM), spatial multiplexing or a combination thereof. In some implementations, the TDM provides a workload access to a relatively large resource for a short amount of time, and the spatial multiplexing provides a continuous access to a relatively small resource. In some implementations, hardware virtualization is limited to one of TDM and spatial multiplexing, which may be sub-optimal. Spatial allocation to the workload for an entire frame could under-utilize physical resources, while the TDM could break many workload and does not provide continuous access to resource throughout a real-time deadline during which the frame needs to be rendered. A game scene that must maintain 60 fps has a real-time deadline of 16.67 ms to complete a frame, and sub-dividing that with a TDM access may result in unachievable rendering despite ample resource.

In accordance with some implementations of this application, processing capability is therefore managed for the server system 114 (particularly, the game server 122) that includes one or more processing cores (e.g., GPU cores of GPU 140) and hosts the real-time, online, and interactive gaming environment 100. In some implementations, the one or more processing cores operates with a plurality of processing slices (e.g., each lasting for 16.67 ms). Upon receiving requests to initiate a plurality of online gaming sessions 116, the server system allocates each of the plurality of processing slices of the one or more processing cores to a subset of the plurality of online gaming sessions 116 to be executed thereon, e.g., allocates a first processing slice to a first subset of the online gaming sessions including a first gaming session and a second gaming session. Each of the sessions 116 corresponds to a respective real time user-interactive application being executed on one or more remote client devices 102. At the first processing slice, the server system 114 determines a time-sharing processing schedule for the first subset of the online gaming sessions 116, such that each of the first subset of gaming sessions 116 is assigned to a duty cycle of the first processing slice. In accordance with the time-sharing processing schedule, the first and second gaming sessions 116 share a first duty cycle of the first processing slice, and are thereby executed in parallel according to real-time data processing need of the first and second gaming sessions 116.

An online interactive gaming session 116 demands encoding of a high quality real-time video stream that has a high resolution and a low latency. In some implementations, application-specific integrated circuit (ASIC) could be designed for very specific use-cases. Alternatively, in some implementations, a general-purpose ASIC is configured to support a first set of game contexts at relatively low resolutions and a second set of game contexts at relatively high resolutions, while satisfying latency requirements for both sets of game contexts.

In one aspect of this application, the server system 114 (particularly, the game server 122) is configured to provide two or more media streams concurrently. Encoder 142 of the server system 114 are configured to generate a plurality of media streams including a low latency stream 130 and a normal latency stream 132. The low latency stream 130 corresponds to an online interactive session 116, and has a faster response rate and lower transmission latency than the normal latency stream 132. Specifically, the encoder 142 first identifies a predefined frame rate (e.g., 60 pfs) for encoding a sequence of image frames of the low latency stream, and determines a first time interval (e.g., 16.67 ms) corresponding to the predefined frame rate. For each image frame in the first sequence of image frames of the low latency stream 130, the encoder 142 encodes the image frame during the first time interval, and determine a remaining time left in the first time interval after encoding the image frame. When the remaining time left in the first time interval satisfies a normal latency requirement associated with the normal latency stream 132, the encoder 142 of the server system 114 generate a subset of the second sequence of image frames of the normal latency stream 132 during the remaining time of the first time interval. Alternatively, when the remaining time left in the first time interval does not satisfy the normal latency requirement, the encoder 142 aborts generating any image frame of the second sequence of image frames during the remaining time of the first time interval. As such, an encoding priority is granted to the low latency stream 130 while the remaining time left in the first time interval is not wasted but utilized to encode the normal latency stream 132.

Further, to expedite image encoding within the first time interval, the encoder 142 of the server system 114 does not need to wait until a GPU 140 has made available all data of an image frame. Rather, in some implementations, a portion of an image frame is encoded as soon as information required for encoding the portion is provided by the GPU 140, independently of whether other portions of the image frame that are irrelevant for encoding the encoded portion are made available or not by the GPU 140. More specifically, for the server system 114 including a GPU, an encoder 142 and a data buffer 144, the encoder 142 identifies frame data of an image frame associated with an online gaming session 116 and stored in the data buffer 144, and allocates a plurality of encoder cores of the encoder 142 to process a plurality of image tiles of the frame data simultaneously and in parallel. The plurality of image tiles includes a first image tile assigned to a first encoder core, and the first image tile includes a first sequence of blocks. The encoder 142 obtains from the data buffer 144 a first block of the first sequence of blocks of the first image tile assigned to the first encoder core, and boundary information of the first block. While or prior to obtaining from the data buffer 144 a second block that follows the first block in the first sequence of blocks, the encoder encodes the first block of the first sequence of blocks based on the boundary information. The encoder 142 then transmits the encoded first block to a client device 102 of a user associated with the online gaming session 116. By these means, the server system 114 better utilizes encoding capability of the encoder 142 by reducing idle times for awaiting the GPU 140 to provide a complete set raw data for each image frame, and can therefore encode image frames of two or more media streams within time intervals (e.g., 16.67 ms) that are associated with a predefined frame rate of high definition gaming content.

In addition, the server system 114 can dynamically generate a number of frames in response to a user command from a user who plays an online gaming session 116. In accordance with a type of the user command (e.g., jumping, shooting a gun), the server system determines an expected response latency, actual communication and processing latencies, and an actual transmission latency. The number of frames is calculated based on the actual transmission latency and a predefined frame rate. As a result, the command is executed in the online gaming session by generating a set of frames reflecting an effect of the command. The set of frames when transmitted at a predefined frame rate occupy a transmission time corresponding to the actual transmission latency, and can be received at a client device of the user within a time corresponding to the expected response latency.

Referring to FIG. 1B, the server system 114 provides the gaming API and cloud platform 150 to enable efficient, portable, low latency hosting of third party gaming content used in the online gaming session 116. In some implementations, the gaming API and cloud platform 150 is enabled by a server system 114 that further includes one or more of: a frontend server 134, a media streaming server 124, a game server 122, and one or more third party content servers 136. The frontend server 134 manages user accounts associated with the client devices 102 and 104, e.g., subscriptions to membership of one or more online interactive games by a user account. After the client devices 102 log onto their respective user accounts and join their online gaming sessions 116, the game server 122 sets up the game sessions 116, and manages each specific gaming session 116 for a respective client device 102 by obtaining game contents from the content servers 136, sending the game contents to the game applications executed on the client devices 102, identifying user requests or actions, rendering gameplay outputs for the client devices 102 in response to the user requests or actions, and storing game state data during the respective gaming session 116. The game server 122 includes one or more processing units (e.g., CPU(s) 138, GPU(s) 140 and encoder 142), memory 146, and a data buffer 144 that temporarily stores multimedia content generated by the GPU 140 and provides the multimedia content to the encoder 142 for further encoding (e.g., standardization or compression). The data buffer 144 is optionally integrated in or independent of the memory 146.

In some implementations, the game server 122 dynamically allocates cloud gaming hardware resources (e.g., GPU 140 and encoder 142) and monitors and utilizes network bandwidth available to individual end users to provide optimal cloud gaming experience. In some implementations, the game server 122 provides multiple performance tiers, including a tier that supports high performance, real time gaming sessions with high definition video/media streams. In some implementations, the game server 122 supports different subscription models and/or are configured to provide one or more concurrent real time gameplay and/or review media streams that correspond with little or no latency to one or more actual gaming streams (e.g., a video stream output to a client device of a user participating in an online/cloud gaming session via either a mobile app or a browser-based program). Specifically, the game server 122 is configured to generate concurrent media streams for gameplay and review videos, and the media streaming server 124 is provided with review videos for concurrent gameplay. Such review videos are provided with little or no latency via a media streaming site, such as YouTube, to one or more users. The media streaming site is optionally managed by the media streaming server 124.

Some implementations enable the hosting of public events in conjunction with gaming competitions. For example, in conjunction with a multi-player gaming event or competition based on a hosted game, a cloud gaming site that is hosted by the game server 122 can broadcast or stream to specific reviewer client devices 104, optionally via the media streaming server 124: (a) one or more concurrent ancillary or supplemental media streams, including associated commentary tracks/streams, (b) gaming streams from different competitor points of view, a highlights stream showing particularly compelling gaming action based on cloud server analysis and/or scoring of multiple gaming sessions associated with the gaming event, (c) one or more game point of view streams reflecting gameplay sessions 116 of one or more active gamers, and/or (d) instructional tracks from one or more active gamers and/or commentators, possibly including real time picture-in-picture (PIP) video sent by the active gamers to the cloud gaming server system 114 along with their corresponding gameplay responses.

In accordance with some implementations, examples of third party content that can be effectively hosted by the content servers 136 include, without limitation, sports games, racing games, role playing games (RPG) and first person shooter (FPS) games. Different instances of these games may have widely varying cloud hardware requirements and network (e.g., to ensure an optimal user gaming experience-consistent in some instances with different subscription performance tiers) based on different associated latency requirements and expectations, output video resolution, and gaming server computational workload and video encoding/streaming resources, and network bandwidth.

In some implementations, the frontend server 134 provides account management APIs and/or software modules that monitor gameplay activity and related requests of subscribers (e.g., requests by end users to invite other players to participate in a gaming session, upgrade their in-game tools, and/or gaming performance) and transmit or make available by APIs associated information to the third party content servers 136 to enable content providers to track settings (including but not limited to billing information, in-game credits, subscription level, etc.) of their subscribers and/or followers. In some implementations, a content provider of hosted content can provide via the same hosting platform 150 one or more different subscription models for the hosted content. In some implementations, a user (e.g., a subscriber to a gaming service) is granted unlimited access and gameplay to all games offered by the content provider on the hosting platform 150. In some implementations, a user (e.g., a subscriber to a gaming service) is granted unlimited access and gameplay to one or more specific gaming franchises (e.g., a specific football or first person shooter franchise) offered by the content provider on the hosting platform 150. In some implementations, the subscriptions are for limited participation by a user— where the participation can be limited based on gameplay time, level of hardware resources committed to the end user, or end user device type/location. In some implementations, the account APIs and modules configure and monitor gameplay sessions, and enable the content providers to track, gaming activity of respective subscribers in accordance with their most current subscription information-even during active gameplay.

The server system 114 enable cloud features that allow a user to move around, e.g., suspending a first game stream of a first gaming session executed on a first client device 102, and restarting the first game stream on a second gaming session of a second client device 102 to continue the first game session. The server system 114 also supports multiple players on a massive scale, and provides richer more persistent cloud-based worlds. The server system 114 uses a cloud-based system to store session data 128 related to different gaming sessions 116 of the same user, or different gaming sessions 116 of different users.

The server system 114 renders gaming content on a plurality of client devices 102 and 104, including but not limited to, mobile phones, tablet computers, desktop computers, and televisions. Optionally, the gaming content is dynamically adjusted to comply with the specifications of these client devices 102 and 104. In some implementations, the client devices 102 and 104 have a limited or no storage capability, because the gaming API platform 150 provides Instant access and require no or little user device storage (e.g., a user can start playing in 5 seconds and save 250 GB of console hard drive space).

In addition to gaming content, the server system 114 also streams to the client devices 102 and 104 add-on content, e.g., new league rosters, statistics, and preview access to early titles, which is optionally updated regularly (e.g., readily updated, upgraded every day or every hour). In some implementations, the add-on content includes search result of an Internet search or a database search.

In some implementations, the server system 114 supports a live online community associated with a game application. Users (e.g., subscribers of a service) participate in live events, tournaments or activities on the corresponding gaming API platform throughout the day. Examples of the live events, tournaments or activities include spectating live gaming sessions played by other users, posting your accomplishments to a public domain (e.g., YouTube), and getting live tips and coaching videos. For example, in response to a user action, the game server 122 provides two or more live streams 130 and 132. While keeping a first gaming stream 130 on a first gaming session 116 of the first client device 102A for a game player, the server system 114 also broadcasts a second live review stream 132 (e.g., YouTube streams) to one or more other client devices 104 (e.g., of subscribers). The second live review stream 132 allows the user to share gaming experience with audience. Optionally, the second live stream is a reproduction of a screen of the first client device 102A of the player. The server system 114 may obtain an audio stream in which the player explains the first gaming session 116, or a video stream of the player playing and explaining the first gaming session 116. The audio stream is optionally played for the audience while the second live review stream 132 is played for the audience. The video stream is optionally played in an embedded window in the second live review stream 132. More details are explained below with reference to FIGS. 8A-8C.

Some implementations provide true on-the-go gaming— where the user is able to take with them—to any location or client device-their most desired games. For example, a user can start an online gaming session 116 on a mobile device 102A on his or her commute, then seamlessly resume the gaming session 116 at his or her destination on a laptop computer 102B. Also, in some implementations, based on the different client device resources available to a user as the gaming session 116 is handed off between different devices 102, the server system 114 (specifically, the game server 122) can dynamically deploy a different set of hardware resources (e.g., GPU 140 and encoder 142) to optimize the user's gaming experience based on the different end user current device resources (e.g., client hardware capability and network bandwidth).

In the server system 114, the frontend server 134 and the game server 122 can have a respective user account system. In an example, the user account system for the frontend server 134 is used to manage subscription to specific gaming content and service, and the user account system for the game server 122 (e.g., a YouTube or Google account) is used for managing gaming experience (e.g., rendering gaming content to satisfy specific gaming criteria) and many other purposes. In some implementations, these two user account systems share customer and usage data (e.g., social, friends, presence, authentication, account information, billing information). Also, the content frontend server 134 provides a service layer that sits on top of a technology layer enabled by the game server 122. In some implementations, gaming content server(s) 136 manage additional user account systems for accessing their content. Optionally, the additional user account systems for gaming content are integrated with the user account system for the frontend server 134 that manages user subscription.

As shown in FIG. 1B, the gaming API platform 150 is created by/hosted by a game server 122 and enables the gaming session 116 in conjunction with a frontend server 134 and content server(s) 136. The frontend server 134 is configured to provide service to a user of the gaming session 116, and to manage accounts for users. Optionally, the users have to subscribe to a gaming service via the frontend server 134. The content servers 136 provide gaming content related to the gaming session 116. Referring to FIG. 1C, the game server 122 executes (152) a gaming application to enable a gaming session 116 based on corresponding gaming content. In some implementations, the frontend server 134 and the game server 122 are owned and managed by distinct entities. Specifically, an online gaming application is executed for displaying a gaming user interface on a first client device 102 or an output device 108 coupled thereto (e.g., a television). A user selection is received at the user interface for subscribing to gaming service. To subscribe the gaming service, the server system 114 receives (154) user information, thereby allowing a user of the first client device 102 to register for one of different types of services (e.g., a free trial service or a regular subscribed service). On the user interface, the user of the client device 102 may browse (156) through a series of rich hubs for each content domain (also called content franchise). The user interface is configured to display game content, add-on content (e.g., news, statistics), and live events (e.g., gaming broadcast from another user, live chat messages).

In some implementations, a user selection of a game (e.g., a live football game) is received (158) at the user interface. In response to the selection, the game application is loaded for the first client device 102 within a predetermined delay time, and a gaming environment is made available to the user. Alternatively, in some implementations, in response to a user action, the server system 114 provides (160) live streams to the user of the first client device 102. For example, the server system 114 provides a first gaming stream on the first gaming session of the first client device, and concurrently broadcasts a second live YouTube stream to one or more other client devices 104. The second live stream allows the user to share gaming experience with audience. Optionally, the second live stream includes an audio feed or a video feed provided by the user of the first client device 102 while the user is playing the gaming based on the first gaming stream.

In some implementations, the user of the first client device 102 may need to use a distinct client device (e.g., due to moving to a different location). In response to a user action to pause the first game session, the server system suspends (162) the first game stream of the first gaming session executed on the first client device 102, and records latest status information concerning the first gaming session 116. The user of the first client device 102 may restart the first game stream on a second gaming session of a second client device to continue the first game session. The latest status information is transferred to the second gaming session to allow seamless gaming experience for the user of the first and second client devices.

Figure 2:
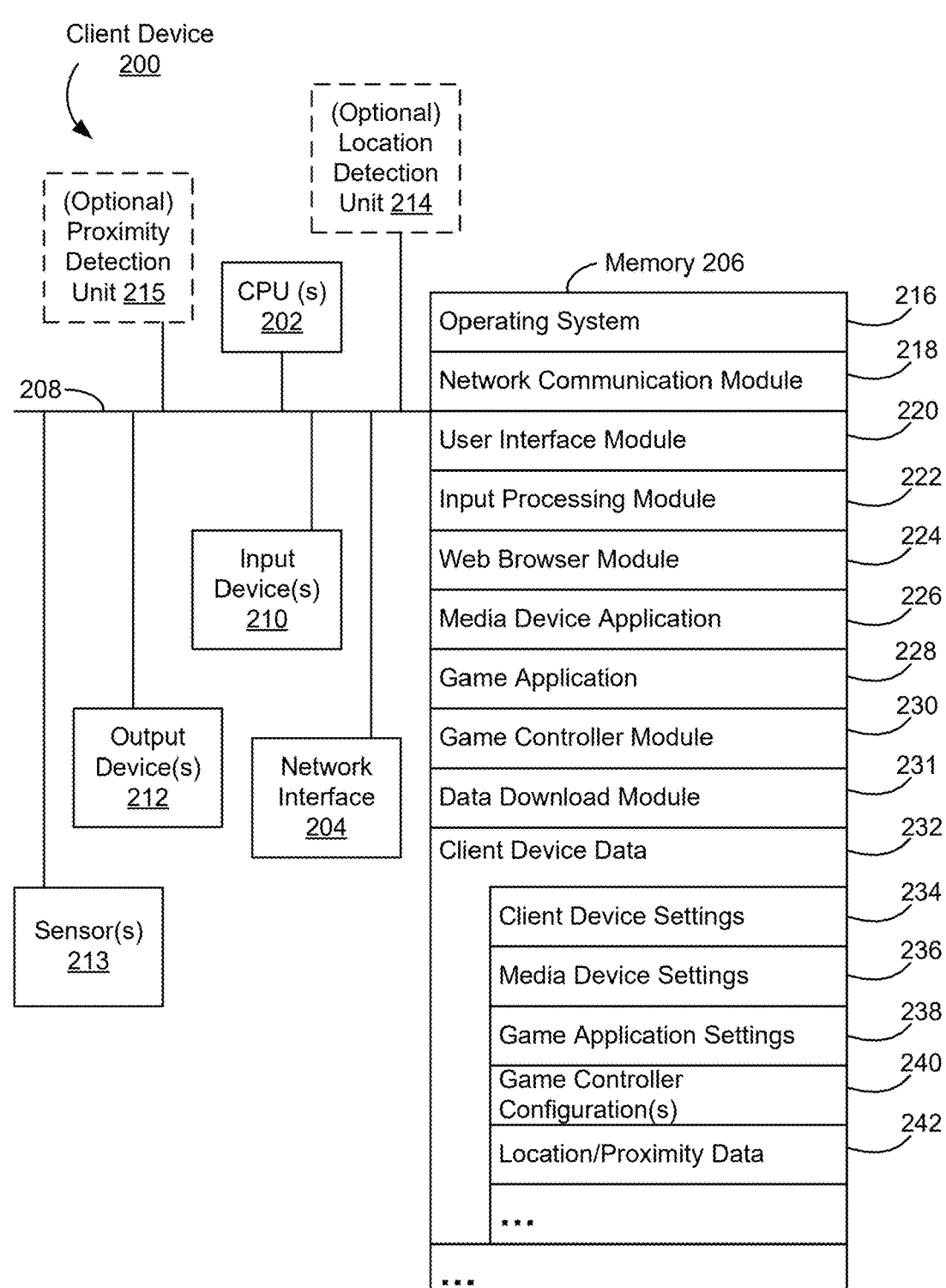
FIG. 2 is a block diagram illustrating an example client device 200 (e.g., the client device 102 or 104) of the gaming environment 100 in accordance with some implementations.

FIG. 2 is a block diagram illustrating an example client device 200 (e.g., the client device 102 or 104) of the gaming environment 100 in accordance with some implementations. Examples of the client device 200 include, but are not limited to, a mobile phone, a tablet computer, a laptop computer, a desktop computer, and a wearable personal device. The client device 200 includes one or more processing units (CPUs) 202, one or more network interfaces 204, memory 206, and one or more communication buses 208 for interconnecting these components (sometimes called a chipset). The client device 200 includes one or more input devices 210 that facilitate user input, such as a keyboard, a mouse, a voice-command input unit or microphone, a touch screen display, a touch-sensitive input pad, a gesture capturing camera, or other input buttons or controls. Furthermore, some the client devices 200 use a microphone and voice recognition or a camera and gesture recognition to supplement or replace the key board. In some implementations, the client device 200 includes one or more cameras, scanners, or photo sensor units for capturing images, for example, of graphic series codes printed on electronic devices. The client device 200 also includes one or more output devices 212 that enable presentation of user interfaces and display content, including one or more speakers and/or one or more visual displays. Optionally, the client device 200 includes a location detection device 214, such as a GPS (global positioning satellite) or other geo-location receiver, for determining the location of the client device 200. The client device 200 may also include a proximity detection device 215, e.g., an IR sensor, for determining a proximity of a media device 106 and/or of player clients 104. The client device 200 may also include one or more sensors 213 (e.g., accelerometer, gyroscope, etc.) for sensing motion, orientation, and other parameters of the client device 200, which may be used as input.

Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 202. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

Operating system 216 including procedures for handling various basic system services and for performing hardware dependent tasks;

Network communication module 218 for connecting the client device 200 to other devices (e.g., the server system 114, the media device 106, and other client device 102 or 104) via one or more network interfaces 204 (wired or wireless) and the local network and one or more networks 112, such as the Internet, other wide area networks, local area networks, metropolitan area networks, and so on;

User interface module 220 for enabling presentation of information (e.g., a graphical user interface for presenting applications, widgets, websites and web pages thereof, and/or games, audio and/or video content, text, etc.) at the client device 200 via one or more output devices 212 (e.g., displays, speakers, etc.);

Input processing module 222 for detecting one or more user inputs or interactions from one of the one or more input devices 210 and interpreting the detected input or interaction;

Web browser module 224 for navigating, requesting (e.g., via HTTP), and displaying websites and web pages thereof, including a web interface for joining the session 116;

Media device application 226 for interacting with a media device 106, including logging into a user account associated with the media device 106, controlling the media device 106 if associated with the user account, and editing and reviewing settings and data associated with the media device 106;

Game application(s) 228 for providing game(s) on the client device 200, including facilitating corresponding gameplay and facilitating invitation of additional players;

Game controller module 230 for providing a gameplay input interface to the game application(s) 228;

Data download module 231 for downloading data (e.g., game controller configurations 456 (FIG. 4), game applications 228 and other applications, updates to modules and applications and data in memory 206) from server system 114 and other content hosts and providers; and client data 232 storing at least data associated with the game application 228 and other applications/modules, including:

Client device settings 234 for storing information associated with the client device 200 itself, including common device settings (e.g., service tier, device model, storage capacity, processing capabilities, communication capabilities, etc.);

Media device settings 236 for storing information associated with user accounts of the media device application 226, including one or more of account access information, and information for device settings (e.g., service tier, device model, storage capacity, processing capabilities, communication capabilities, etc.);

Game application(s) settings 238 for storing information associated with user accounts of the game application(s) 228, including one or more of account access information, in-game user preferences, gameplay history data, and information on other players;

Game controller configuration(s) 240 for storing information associated with configurations (e.g., received configurations from game controller configurations 456, FIG. 4) of game controller module 230 for game application(s) 228; and Location/proximity data 242 including information associated with the presence, proximity or location of any of the client device 102 and 104 and the media device 106.

In some implementations, the game controller module 230 is a part (e.g., a sub-module) of the media device application 226 or another application in memory 206. In some implementations, the game controller module 230 is a part of the operating system 216. In some implementations, the game controller module 230 is a distinct module or application.

In some implementations of the client device 102, the media device application 226 (and correspondingly media device settings 236) and game application 228 (and correspondingly game application settings 238) are optional. Depending on the particular game to which the client device

102 is invited to join, the media device application 226 and the game application 228 are not required to play. If any of these applications are needed for playing the game (e.g., the game uses a game controller module 230 within the media device application 226), and the application is not in memory 206, the client device 102 may be prompted to download the application.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
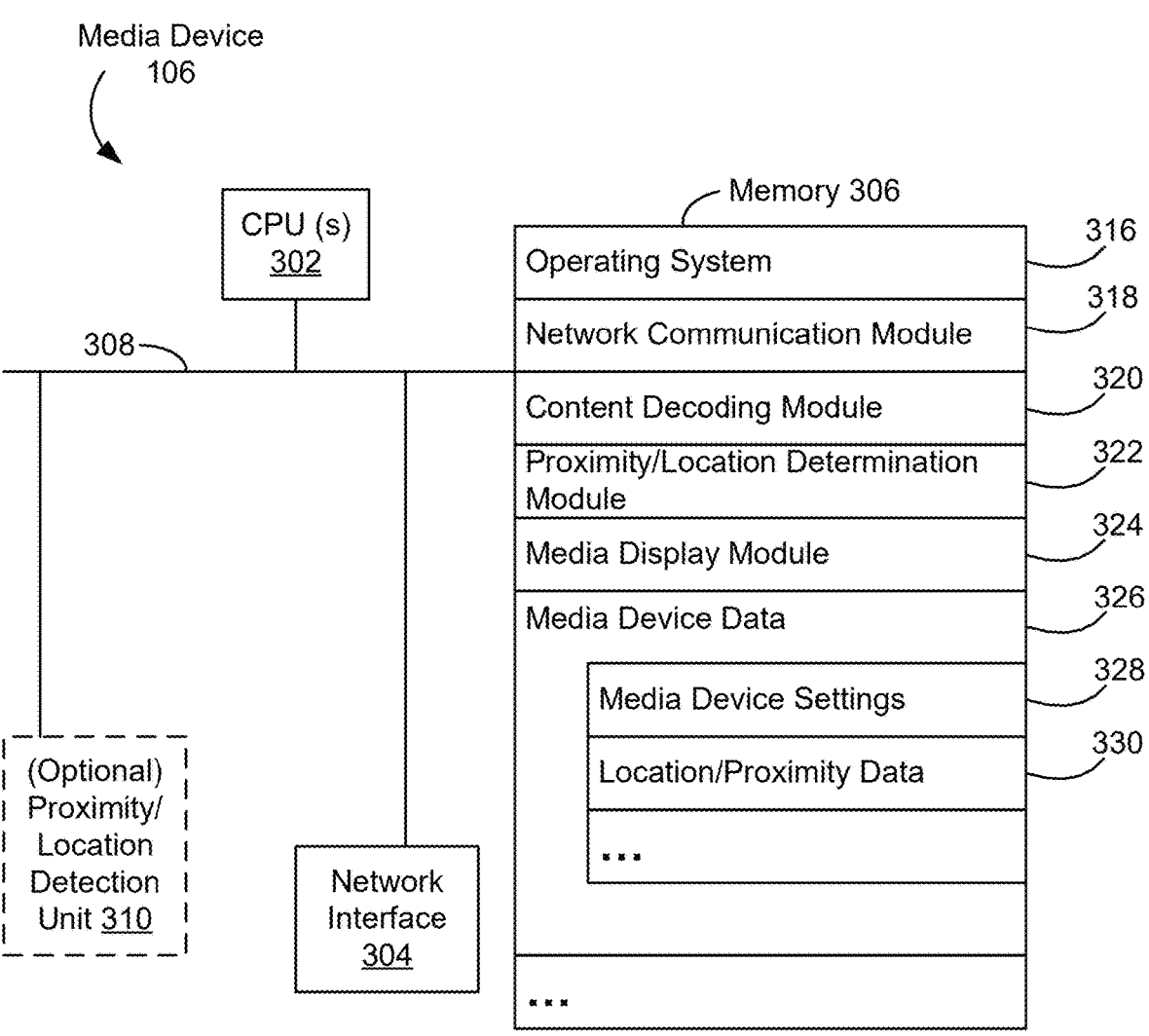
FIG. 3 is a block diagram illustrating an example media device in accordance with some implementations.

FIG. 3 is a block diagram illustrating an example media device 106 of the gaming environment 100 in accordance with some implementations. The media device 106, typically, includes one or more processing units (CPUs) 302, one or more network interfaces 304, memory 306, and one or more communication buses 308 for interconnecting these components (sometimes called a chipset). Optionally, the media device 106 includes a proximity/location detection unit 310, such as an IR sensor, for determining the proximity of a client device 102 or 104.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

Operating system 316 including procedures for handling various basic system services and for performing hardware dependent tasks;

Network communication module 318 for connecting the media device 106 to other computers or systems (e.g., the server system 114, and the client device 102) via one or more network interfaces 304 (wired or wireless) and one or more networks 112, such as the Internet, other wide area networks, local area networks, metropolitan area networks, cable television systems, satellite television systems, IPTV systems, and so on;

Content Decoding Module 320 for decoding content signals received from one or more content sources (e.g., server system 114 for output from the game session 116) and outputting the content in the decoded signals to an output device 108 coupled to the media device 106;

Proximity/location determination module 322 for determining the proximity of the client device 102 and/or 104 based on proximity related information that is detected by the proximity detection unit 310 or provided by the server system 114;

Media display module 324 for controlling media display; and

Media device data 326 storing at least data including:

Media device settings 328 for storing information associated with user accounts of a media device application, including one or more of account access information and information for device settings (e.g., service tier, device model, storage capacity, processing capabilities, communication capabilities, etc.); and Location/proximity data 330 including information associated with the presence, proximity or location of any of the client device 102 and/or 104, and the media device 106.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

Figure 4:
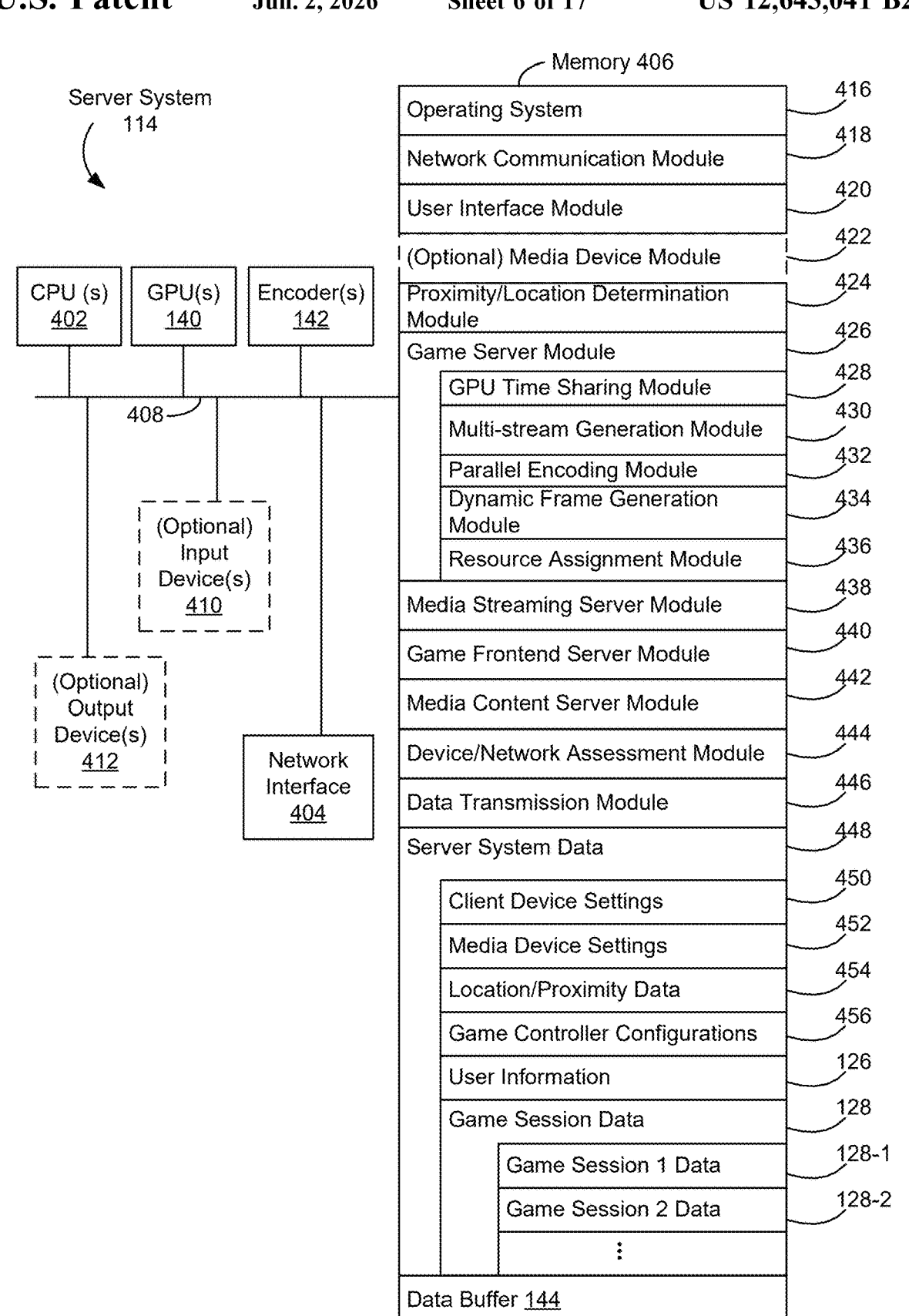
FIG. 4 is a block diagram illustrating an example server in accordance with some implementations.

FIG. 4 is a block diagram illustrating an example server in the server system 114 of the gaming environment 100 in accordance with some implementations. The server system 114, typically, includes one or more processing units (e.g., CPU(s) 402, GPU(s) 140 and encoder 142), one or more network interfaces 404, memory 406, and one or more communication buses 408 for interconnecting these components (sometimes called a chipset). The server system 114 may optionally include one or more input devices 410 that facilitate user input, such as a keyboard, a mouse, a voice-command input unit or microphone, a touch screen display, a touch-sensitive input pad, a gesture capturing camera, or other input buttons or controls. Furthermore, the server system 114 may use a microphone and voice recognition or a camera and gesture recognition to supplement or replace the keyboard. In some implementations, the server system 114 optionally includes one or more cameras, scanners, or photo sensor units for capturing images, for example, of graphic series codes printed on electronic devices. The server system 114 may also include one or more output devices 412 that enable presentation of user interfaces and display content, including one or more speakers and/or one or more visual displays.

Memory 406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 406, optionally, includes one or more storage devices remotely located from one or more processing units. Memory 406, or alternatively the non-volatile memory within memory 406, includes a non-transitory computer readable storage medium. In some implementations, memory 406, or the non-transitory computer readable storage medium of memory 406, stores the following programs, modules, and data structures, or a subset or superset thereof:

Operating system 416 including procedures for handling various basic system services and for performing hardware dependent tasks;

Network communication module 418 for connecting the server system 114 to other devices (e.g., various servers in the server system 114, the client device 102 and/or 104, and the media device 106) via one or more network interfaces 404 (wired or wireless) and one or more networks 112, such as the Internet, other wide area networks, local area networks, metropolitan area networks, and so on;

User interface module 420 for enabling presentation of information (e.g., a graphical user interface for presenting application(s), widgets, websites and web pages thereof, and/or games, audio and/or video content, text, etc.) at the client device 102 and/or 104;

Media device module 422 (optional) that is executed to provide server-side functionalities for device provisioning, device control, and user account management associated with media device(s) 106;

Proximity/location determination module 424 for determining the proximity of the client device 102 and/or 104 to the media device 106 based on location information of any of the client device (102 and/or 104) and the media device 106;

Game server module 426 for providing server-side functionalities associated with games (e.g., game application(s) 228), including but not limited to setting up game sessions, storing session state data and other game-related data, processing gameplay inputs from client device 102 and 104, and rendering gameplay outputs in response to the gameplay inputs;

Media streaming server module 438 for hosting a media streaming site, receiving concurrent ancillary or supplemental media streams associated with an online gaming session, and providing the concurrent media streams to a client device 104 for concurrent display with the online gaming session that is being executed on the game applications 228 of the same client device 104 or a distinct client device 102;

Frontend server module 440 for managing user accounts associated with the client devices 102 and 104, e.g., subscriptions to membership of one or more online interactive games by a user account, enabling service to subscribers for forwarding subscriber requests to the game server module 426, and monitoring gameplay activity and related requests of subscribers;

Media content server module 442 for providing access to game contents hosted by one or more third party content providers;

Device/network assessment module 444 for assessing device and network capabilities of client device 102 and/or 104, including but not limited to assessing network bandwidth of the connection to the client device 102/104 and assessing whether the client device 102/104 has the needed module or application to play a game;

Data transmission module 446 for providing data (e.g., game controller configurations 456), software updates, etc.) to client devices 102/104; and Server system data 448 including:

Client device settings 450 for storing information associated with the client devices 102 and 104, including common device settings (e.g., service tier, device model, storage capacity, processing capabilities, communication capabilities, etc.);

Media device settings 452 (optional) for storing information associated with user accounts of the media device application 226, including one or more of account access information and information for device settings (e.g., service tier, device model, storage capacity, processing capabilities, communication capabilities, etc.);

Location/proximity data 454 including information associated with the presence, proximity or location of any of the client device 102 and/or 104 and the media device 106;

Game controller configurations 456 for storing controller configurations for various games; and User information 126 for storing information associated with user accounts of each of one or more game applications (e.g., game application 228, FIG. 2) that are hosted on the server system 114, including for example user account information (e.g., identification and passwords), membership type, preference, and activity history; and Game session data 128 for storing data associated with game sessions (e.g., game state data, other game-related data), including for example data 128-1 for a first game session and data 128-2 for a second game session, where the session data 128 for each game session includes, but is not limited to a frame rate, a rendering specification, a normal latency requirement, information of GPU allocation, information of encoder allocation, identifications of related sessions, and latest status information associated with the respective game session.

In some implementations, the game server module 426 includes the following programs, modules, or a subset or superset thereof:

GPU time sharing module 428 for allocating each processing slice of the GPUs 140 to a respective subset of online gaming sessions and dynamically sharing a duty cycle of a processing slice among two or more gaming sessions (i.e., executing the two or more gaming sessions simultaneously and in parallel during the duty cycle) according to real-time data processing need of the first and second gaming sessions;

Multi-stream generation module 430 for encoding both a low latency stream and a normal latency stream within time intervals corresponding to a predefined frame rate;

Parallel encoding module 432 for allocating encoder cores of the encoder 142 to process image tiles of an image and enabling the encoder cores to encode each individual block in a respective image tile as soon as data of the individual block and its corresponding boundary information are available;

Dynamic frame generation module 434 for dynamically generating a variable number of frames in response to a user command based on a predefined frame rate and corresponding communication and processing latencies associated with the user command during an online gaming session; and Resource assignment module 436 for determining target quality parameters of an online gaming session based on corresponding device and connection capabilities, associating resource of the server system 114 (e.g., virtual machines therein) with the online gaming session based on the target quality parameters, and managing the online gaming session according to a resource profile of the associated resource.

In some implementations, the memory 406 further includes a data buffer 144 configured to couple the encoder 142 to the GPU 140. Specifically, the data buffer 144 temporarily stores gameplay multimedia content generated by the GPU 140 in association with one or more output media streams, such that the encoder 142 can retrieve the gameplay multimedia content from the data buffer 144 and encode the retrieved content to the one or more media streams, e.g., for standardization, speed or compression.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 406, optionally, stores a subset of the modules and data structures identified above. Furthermore, memory 406, optionally, stores additional modules and data structures not described above.

GPU Virtualization

FIG. 5A is a block diagram of an example server system 114 including at least a GPU 140 in accordance with some implementations. Referring to FIG. 4, the server system 114 includes one or more processing units (e.g., CPU(s) 402, GPU(s) 140 and encoder(s) 142), memory 406, and a data buffer 144 that is optionally part of or separate from the memory 406. The CPU 402, GPU 140 and encoder 142 function together to provide server-side functionalities associated with games (e.g., game application(s) 228), including but not limited to setting up game sessions, storing game state data and other game-related data, processing gameplay inputs from client device 102 or 104, and rendering gameplay outputs associated with the gameplay inputs. In some implementations, the CPU 402 is configured to interact with the client device to provide game controller configurations 456, facilitate setting up the game application(s) 228, set up game sessions or spectator review sessions, and/or receive the gameplay inputs. The GPU 140 is configured to obtain the gameplay inputs and generate gameplay multimedia content, e.g., by creating lighting effects and transforming objects every time a scene is redrawn. The encoder 142 is configured to encode (e.g., standardize or compress) the gameplay multimedia content provided by the GPU to one or more output media streams each having a predetermined media format. Optionally, the encoder 142 is part of the GPUs 140. Optionally, the encoder 142 is distinct from the GPU 140, and the data buffer 144 is coupled between the encoder 142 to the GPU 140. Specifically, the data buffer 144 temporarily stores the gameplay multimedia content generated by the GPU 140 in association with the one or more output media streams, such that the encoder 142 can retrieve the gameplay multimedia content from the data buffer 144 and encode the retrieved content to the one or more media streams, e.g., for standardization, speed or compression.

In some implementations, the GPU 140 includes a plurality of GPU cores 500. In some implementations, the GPU 140 interacts with one of an Open Graphics Library (OpenGL) platform, a Vulkan API platform and a DX API platform. For example, the OpenGL platform includes a cross-language, cross-platform API for rendering 2D and 3D vector graphics and achieving hardware-accelerated rendering via the GPU 140. The OpenGL platform is implemented via at least a subset of a pipeline of operations including vertex processing (e.g., transforming vertices into screen space), primitive processing (e.g., organizing the vertices into primitives that are clipped and culled), rasterization (e.g., rasterizing the primitives into pixel fragments), fragment processing (e.g., shading fragments to compute a color at each pixel), and pixel operation (e.g., blending the fragments into a frame buffer at their pixel locations). In some implementations, the OpenGL platform allows the GPU 140 to provide to the encoder 142 the gameplay multimedia content including a plurality of pixels, and each pixel is associated with color information optionally stored in the data buffer 144 in three components, e.g., RGB (green, red, blue), or four components, e.g., CMYK (cyan, magenta, yellow; black).

FIG. 5B is a block diagram of one or more GPU cores 500 that are partitioned to a plurality of processing time slices 502 in accordance with some implementations. The one or more GPU cores 500 is a subset of the plurality of GPU cores 500 shown in FIG. 5A. In some implementations, the one or more GPU cores 500 includes a single GPU core 500 configured to assume one or more image rendering tasks (e.g., rendering media streams for one or more online gaming sessions) independently. In some implementations, the one or more GPU cores 500 includes two or more GPU cores 500 configured to assume one or more image rendering tasks collaboratively. The one or more GPU cores 500 are partitioned to the plurality of processing slices 502. In some implementations, each of the plurality of processing slices 502 lasts for a duration of time corresponding to a target frame rate of at least one of the plurality of online gaming sessions (e.g., a first online gaming session). For example, the target frame rate is 60 fps, and each processing slice 502 lasts for 16.667 ms. A first media stream is generated by the one or more GPU cores 500 for the first online gaming session, and includes an image frame outputted during each of the respective processing slice 502 of the one or more GPU cores 500.

Specifically, in some implementations, the server system 114 receives requests to initiate a plurality of online gaming sessions, and each of the sessions corresponds to a respective real time user-interactive application being executed on one or more remote client devices. Each of the plurality of processing slices 502 of the one or more GPU cores 500 is allocated to a subset of the plurality of online gaming sessions to be executed thereon. For example, a first processing slice 502A is allocated to a first subset of the online gaming sessions including a first gaming session GS1 and a second gaming session GS2. In some implementations, each of the processing slices 502 is allocated to at least one identical gaming session (e.g., the first gaming session GS1), and at least one image is generated during each of the processing slices 502 for the at least one identical gaming session. In some implementations, the subsets of the online gaming sessions allocated to the two consecutive processing slices 502 are distinct from each other, i.e., at least one online gaming session allocated to one of the two consecutive processing slices 502 is not allocated to the other of the consecutive processing slices 502. Further, in some implementations, no online gaming session allocated to one of the two consecutive processing slices 502 is allocated to the other of the consecutive processing slices 502.

Further, at the first processing slice 502A, the server system 114 (e.g., the game server module 426) determines a time-sharing processing schedule for the first subset of the online gaming sessions, such that each of the first subset of gaming sessions is assigned to a duty cycle of the first processing slice 502A. In accordance with the time-sharing processing schedule, the server system 114 enables sharing of a first duty cycle of the first processing slice 502A by executing in parallel the first and second gaming sessions GS1 and GS2 according to real-time data processing need of the first and second gaming sessions GS1 and GS2. For example, the first processing slice 502A lasts for 16.667 ms, and the first duty cycle is 50% of a duration of time of the first processing slice, e.g., 8.333 ms. In an example, during the first duty cycle, the first gaming session GS1 involves a complicated user action (e.g., a fast sprint by a game character), and the second gaming session GS2 involves a simple user action (e.g., a slow walk by a game character). The first duty cycle dynamically spares more resources (processing time or GPU cores) for the first gaming session GS1. Specifically, in some implementations, during the first duty cycle of the first processing slice 502A, the one or more GPU cores 500 execute the first and second gaming sessions GS1 and GS2 in parallel by allocating a respective subset of the one or more GPU cores 500 to each of the first and second gaming sessions GS1 and GS2 according to the respective real-time data processing need (e.g., allocating a larger number of GPU cores 500 for the first gaming session GS1 which involves the complicated user action than the second gaming session G2 which involves the simple user action).

Alternatively, in some implementations, the first gaming session GS1 and the second gaming session GS2 alternate during the first duty cycle. For example, the first duty cycle is 50% of a duration of time of the first processing slice, e.g., 8.333 ms. The one or more GPU cores executes each of the first and second gaming sessions. Each of the first and second gaming sessions is executed for a short period (e.g., 1 ms) prior to switching to the other one of the first and second gaming session.

In some implementations, to allocate each processing slice 502 to its respective subset of gaming sessions, the server system 114 identifies a gaming latency criterion for the respective slice 502, and provides a response that satisfies the gaming latency criterion to each of the subset of online gaming session corresponding to the respective processing slice 502. That said, at the first processing slice 502A, the duty cycle of the first processing slice 502A for each of the first subset of gaming sessions corresponds to a respective processing time that satisfies the gaming latency criterion. Specifically, in an example, the first processing slice 502A lasts for 16.667 ms, and the first duty cycle is 50% of a duration of time of the first processing slice, e.g., 8.333 ms. The gaming latency criterion defines that the processing latency is at most 8.333 ms. Each of the first subset of gaming sessions (e.g., the first and second gaming sessions GS1 and GS2) has a processing latency less than 8.333 ms.

FIGS. 5C-5E are example processes 504, 506 and 508 during which two or more gaming sessions are allocated to the first processing slice 502A in accordance with some implementations. Referring to FIG. 5C, in some implementations, in addition to the first and second gaming sessions GS1 and GS2, the first processing slice 502A is also allocated to a third gaming session GS3. The first subset of the plurality of online gaming sessions allocated to the first processing slice 502A also includes the third gaming session GS3. In accordance with the time-sharing processing schedule, the one or more GPU cores 500 facilitates dynamically sharing of the first duty cycle of the first processing slice 502A among the first, second and third gaming sessions GS1-GS3. The third gaming session GS3 is executed in parallel with the first and second gaming sessions GS1 and GS2 according to real-time data processing need of the third gaming session. Further, referring to FIG. 5D, in some implementations, the first subset of the online gaming sessions also includes the third gaming session GS3. Rather than executing the third gaming session in the first duty cycle, the one or more GPU cores 500 executes the third gaming session in a second duty cycle that follows but is distinct from the first duty cycle of the first processing slice 502A, and the third gaming session does not share the second duty cycle with any other gaming session.

Referring to FIG. 5E, in some implementations, the first subset of the online gaming sessions allocated to the first processing slice 502A further includes the third gaming session GS3 and a fourth gaming session GS4. In accordance with the time-sharing processing schedule, the third and fourth gaming sessions GS3 and GS4 dynamically share the second duty cycle that follows but is distinct from the first duty cycle of the first processing slice 502A. The one or more GPU cores 500 executes in parallel the third and fourth gaming sessions GS3 and GS4 according to real-time data processing need of the third and fourth gaming sessions GS3 and GS4. For example, the first processing slice 502A lasts for 16.667 ms, and includes the first duty cycle followed by the second duty cycle. During the first duty cycle, two image frames correspond to the first and second gaming sessions GS1 and G2, respectively, and are dynamically processed according to the real-time data processing need of the first and second gaming sessions GS1 and GS2. During the second duty cycle, two image frames correspond to the third and fourth gaming sessions GS3 and GS4, respectively, and are dynamically processed according to the real-time data processing need of the third and fourth gaming sessions GS3 and GS4.

Figure 6:
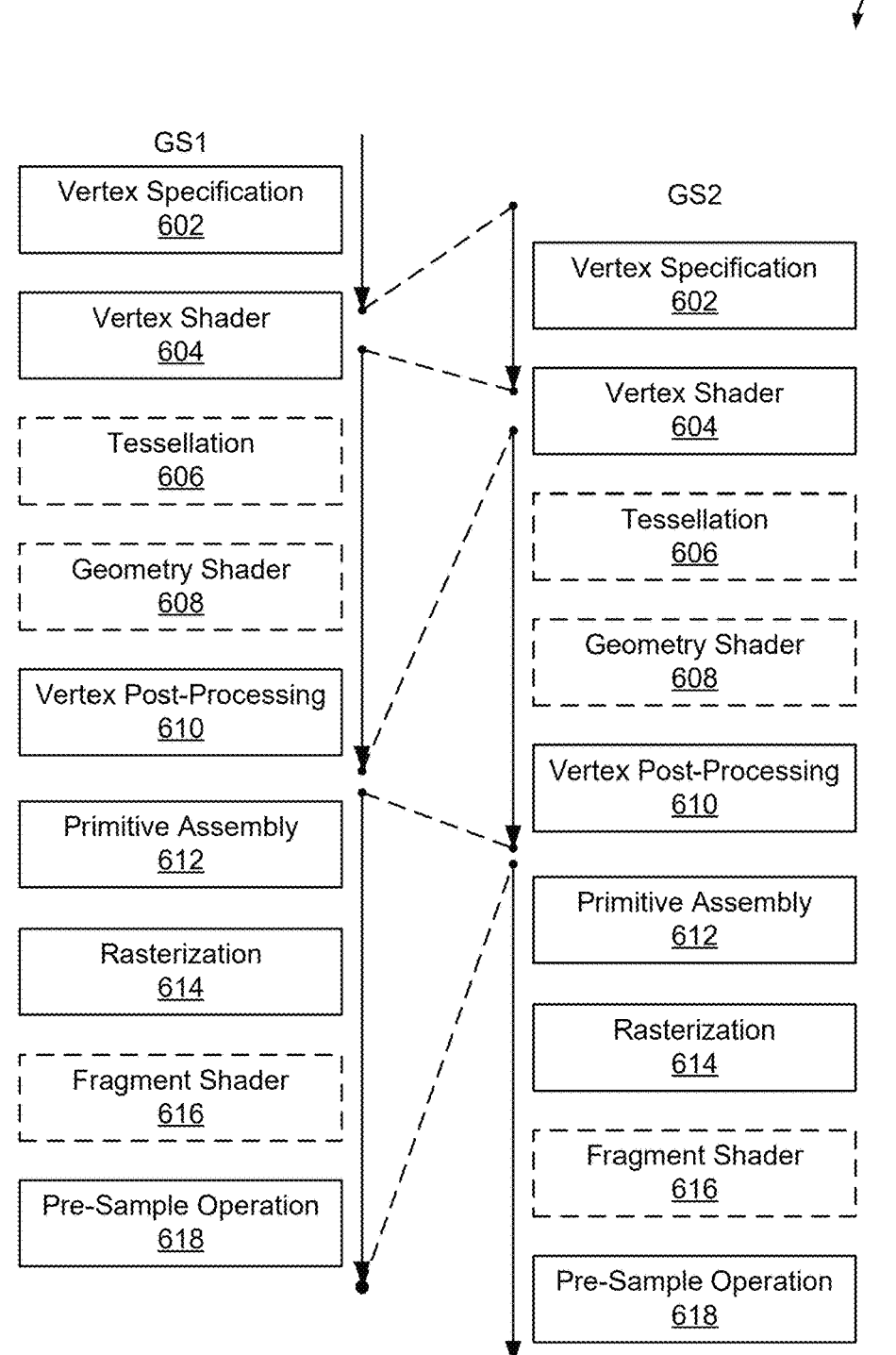
FIG. 6 is an example process of dynamically sharing a processing slice by two gaming sessions that generate media content based on Open Graphics Library (OpenGL) in accordance with some implementations.

FIG. 6 is an example process 600 of dynamically sharing a processing slice (e.g., the first processing slice 502A) by two gaming sessions (e.g., the first and second gaming sessions GS1 and GS2) that generate media content based on an OpenGL platform in accordance with some implementations. Each of the first and second gaming sessions GS1 and GS2 is executed based on the Open Graphics Library and includes a graphics pipeline process. The one or more GPU cores 500 execute the first and second gaming sessions GS1 and GS2 in parallel. Specifically, during the first duty cycle of the first processing slice 502A, while the first gaming session GS1 stands by at a first pipeline stage, the one or more GPU cores 500 implement a second pipeline stage of the second online gaming session GS2. While the second online gaming session GS2 stands by at a third pipeline stage, the one or more GPU cores 500 implement a fourth pipeline stage of the first online gaming session GS1. In some situations, the first and second online gaming sessions GS1 and GS2 stands by at the first and third pipeline stages, respectively, because they are waiting for data required in the first and third pipeline stages to be prepared.

As explained above, the OpenGL platform is implemented via at least a subset of a pipeline of operations including vertex processing (e.g., transforming vertices into screen space), primitive processing (e.g., organizing the vertices into primitives that are clipped and culled), rasterization (e.g., rasterizing the primitives into pixel fragments), fragment processing (e.g., shading fragments to compute a color at each pixel), and pixel operation (e.g., blending the fragments into a frame buffer at their pixel locations). In a specific example, the OpenGL platform implements nine consecutive pipeline stages to render an image frame for each online gaming session. The nine consecutive pipeline stages include a subset or all of:

Vertex specification 602 for preparing vertex array data;

Vertex shader 604 for acting upon each vertex;

Tessellation 606 for optionally subdividing patches of vertex data into smaller primitives;

Geometry shader 608 for optionally converting the smaller primitives to output primitives;

Vertex post-processing 610 for adjusting and shipping the output primitives of the last stage to different locations, including but not limited to transform feedback, primitive clipping, perspective divide, and viewport transform;

Primitive assembly 612 for dividing the output primitives into a sequence of individual base primitive;

Rasterization 614 for breaking down each individual primitive into discrete elements (also called fragments) based on a sample coverage of the primitive;

Fragment shader 616 for processing each fragment generated by rasterization into a set of colors and a single depth value; and Pre-sample operation 618 for processing the set of colors and single depth value to gameplay multimedia content that can be processed by the encoder 142, e.g., for standardization, speed and/or compression., including but not limited to pixel ownership test, scissor test, multi-sample operations, stencil test, depth test, occlusion query updating, blending, sRGB conversion, dithering, logic operation, and write mask and logic operation.

The one or more GPU cores 500 execute the respective nine consecutive pipeline stages for the first and second gaming sessions GS1 and GS2 in parallel during the first duty cycle of the first processing slice 502A. In this example shown in FIG. 6, the one or more GPU cores 500 first implement the stages 602 and 604 of the first gaming session GS1. While the first gaming session GS1 is paused in the middle of the vertex shader 604 (e.g., waiting for data to be ready), the one or more GPU cores 500 obtain vertex specification 602 for the second gaming session GS2. The second gaming session GS2 is then paused at its vertex shader stage 604 (e.g., waiting for data to be ready), and the one or more GPU cores 500 continue to implement the stages 604-610 of the first gaming session GS1. After completing the vertex post-processing stage 610 of the first gaming session GS1 and before starting the primitive assembly stage 612 of the first gaming session GS1, the one or more GPU cores 500 execute the stages 604-610 of the second gaming session GS2. After completing the vertex post-processing stage 610 and before starting the primitive assembly stage 612 of the second gaming session GS2, the one or more GPU cores 500 continue to execute the stage 612-618 of the first gaming session GS1. When the first gaming session GS1 is completed, the one or more GPU cores 500 continue to execute the stages 612-618 of the second gaming session GS2.

In some implementations not shown in FIG. 6, the one or more GPU cores 500 executes each of the nine consecutive pipeline stages for the first and second gaming sessions GS1 and GS2 in an alternating manner. Stated another way, the one or more GPU sequentially implement the vertex specification stage 602 for the first gaming session GS1, the vertex specification stage 602 for the second gaming session GS1, the vertex shader stage 604 for the first gaming session GS1, the vertex shader stage 604 for the second gaming session GS1, and so on, until they complete both the first and second gaming sessions.

In some implementations, the first and second gaming sessions GS1 and GS2 are related to each other and configured to share part of application data used for execution of their respective real time user-interactive applications. For example, the first and second gaming sessions correspond to two players in a scene of a first real time user-interactive gaming application. The second gaming session GS2 may be initialized in response to an invitation from the first gaming session GS1. During the first duty cycle of the processing slice 502A, the one or more GPU cores 500 may use the shared part of application data to implement both the first and second gaming sessions GS1 and GS2.

In some implementations, the first and second gaming sessions are independent of each other and configured to execute two distinct real time user-interactive applications. For example, the first gaming session GS1 implements a Candy Crash game, while the second gaming session GS2 implements a Car Race game.

In some implementations, the GPU 140 includes at least two or more control registers having a first control register and a second control register, and the first and second registers are respectively configured to control the first and second gaming sessions GS1 and G2 in parallel when the first and second gaming sessions GS1 and GS2 dynamically share the first duty cycle of the first processing slice 502A. Further, each of the first and second sessions GS1 and GS2 is associated with a respective cache for temporarily storing respective game session data during this process. For example, referring to FIG. 6, the game session data of the first game session GS1 are stored in its corresponding cache when the first game session GS1 is paused during the vertex shader stage 604 and after the vertex post-processing stage 610, and retrieved for further processing after the first game session GS1 is reactivated during the vertex shader stage 604 and at the primitive assembly stage 612.

In some implementations, vertex data includes a contextual bit configured to be tagged based on a corresponding gaming session (e.g., "job A" for the first gaming session and "job B" for the second gaming session). Data fragments are tagged throughout the pipelined process 600 in association with "job A" and "job B." Optionally, hardware resources (e.g., control registers and caches) are also tagged.

It is noted that in some implementations, the first and second gaming sessions GS1 and GS2 are implemented on a Vulkan API platform, and in some implementations, the first and second gaming sessions GS1 and GS2 are implemented on a DX API platform. In some implementations, the first and second gaming sessions GS1 and GS2 are implemented on two distinct platforms of a plurality of platforms (e.g., OpenGL, Vulkan and DX). Consecutive pipeline stages of each of the first and second gaming sessions GS1 and GS2 correspond to a respective platform on which the respective gaming session is implemented. The consecutive pipeline stages of the first and second gaming sessions GS1 and GS2 can be executed in parallel during the first duty cycle of the first processing slice 502A, even when they are implemented on two distinct platforms.

FIG. 7 is a flow diagram illustrating an example method 700 for managing processing capability of a server system 114 (e.g., processing capability of a GPU 140) in accordance with some implementations. Method 700 is, optionally, governed by instructions that are stored in a computer memory or non-transitory computer readable storage medium (e.g., in the GPU time sharing module 428 of a game server module 426) and that are executed by one or more processors of the server system 114 (e.g., the game server 122). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 700 may be combined and/or the order of some operations may be changed.

Method 700 is performed by the server system 114 including one or more processing cores (e.g., a GPU 140 further including one or more GPU cores 500) and memory storing programs for execution by the processing cores. The one or more processing cores include a plurality of processing slices 502. In some implementations, each of the plurality of processing slices 502 lasts for a duration of time (e.g., 16 ms) corresponding to a target frame rate (e.g., 60 fps) of the plurality of online gaming sessions.

The server system 114 receives (702) requests to initiate a plurality of online gaming sessions, and each of the sessions corresponds to a respective real time user-interactive application being executed on one or more remote client devices (e.g., the client device 102 or 104). The server system 114 allocates (704) each of the plurality of processing slices of the one or more processing cores to a subset of the plurality of online gaming sessions to be executed thereon. Specifically, a first processing slice is allocated (706) to a first subset of the online gaming sessions including a first gaming session GS1 and a second gaming session GS2. In some implementations, the first and second gaming sessions GS1 and GS2 are related to each other and configured to share part of application data used for execution of their respective real time user-interactive applications. Further, in some implementations, the first and second gaming sessions GS1 and GS2 correspond to two players in a scene of a first real time user-interactive gaming application. Alternatively, the first and second gaming sessions GS1 and GS2 are independent of each other and configured to execute two distinct real time user-interactive applications.

At the first processing slice, a time-sharing processing schedule is determined (708) for the first subset of the online gaming sessions, such that each of the first subset of gaming sessions is assigned to a duty cycle of the first processing slice. In an example, the first processing slice lasts for 16.667 ms, and the first duty cycle is 50% of a duration of time of the first processing slice, i.e., 8.333 ms. In some implementations, the first duty cycle is contiguous within the first processing slice 502A. Alternatively, in some implementations, the first duty cycle is not contiguous within the first processing slice 502A, and for example, includes a first plurality of short slices (e.g., 1 ms long) interleaved with and separated by a second plurality of short slices (e.g., 1 ms long).

In some implementations, for each of the plurality of processing slices, a gaming latency criterion is identified to provide to each of the subset of online gaming sessions corresponding to the respective processing slice a response latency that satisfies the gaming latency criterion. Further, in some implementations, at the first processing slice, the duty cycle of the first processing slice for each of the first subset of gaming sessions corresponds to a respective processing time that satisfies the gaming latency criterion. For example, the first processing slice 502A lasts for 16.667 ms, and the gaming latency criterion can require that the response latency must be less than 8 ms. The respective processing time must be less than the response latency, i.e., 8 ms, and thus, the duty cycle of the first processing slice must be less than 48%. In some situations, a subset of the one or more processing cores need to be re-allocated to a corresponding gaming session to satisfy the gaming latency criterion.

In some implementations, allocation of a duty cycle of a processing slice and a subset of the one or more processing cores to a specific gaming session is implemented in a static manner. The GPU 140 estimates respective data processing need for each of the plurality of gaming sessions, and allocates the duty cycle of the processing slice and the subset of the one or more processing cores to the specific gaming session accordingly. Alternatively, in some implementations, the GPU 140 estimates the data processing need of the specific gaming session in real time (e.g., according to complexity of a scene or a user action), and accordingly, allocates the duty cycle of the processing slice and the subset of the one or more processing cores to the specific gaming session dynamically.

In accordance with the time-sharing processing schedule, the first and second gaming sessions share (710) a first duty cycle of the first processing slice 502A by executing in parallel the first and second gaming sessions GS1 and GS2 according to real-time data processing need of the first and second gaming sessions GS1 and GS2. In some implementations, executing in parallel the first and second gaming sessions further includes allocating a respective subset of the one or more processing cores to each of the first and second gaming sessions GS1 and GS2 according to the respective data processing need. In some implementations, the one or more processing cores include at least two or more control registers further including a first control register and a second control register, and the first and second registers are configured to control the first and second gaming sessions GS1 and GS2 in parallel when the first and second gaming sessions GS1 and GS2 dynamically share the first duty cycle of the first processing slice 502A.

In some implementations, each of the first and second gaming sessions GS1 and GS2 is executed based on an OpenGL platform and includes a graphics pipeline process. During the first duty cycle of the first processing slice 502A, the first online gaming session stands by at a first pipeline stage (e.g., at vertex shader stage 604), and a second pipeline stage of the second online gaming session (e.g., vertex specification 602) is implemented by the one or more processing cores. Further, while the second online gaming session stands by at a third pipeline stage (e.g., vertex shader 604), a fourth pipeline stage of the first online gaming session GS1 (e.g. an of stages 606-610) is implemented by the one or more processing cores. More details on dynamically executing the first and second gaming sessions on the OpenGL platform are discussed above with reference to FIG. 6.

In some implementations, the first subset of the online gaming sessions further includes a third gaming session GS3. In accordance with the time-sharing processing schedule, the third gaming session GS3 also dynamically shares (712) the first duty cycle of the first processing slice with the first and second gaming sessions GS1 and GS2. The third gaming session GS3 is executed in parallel with the first and second gaming sessions GS1 and GS2 according to real-time data processing need of the third gaming session. In some implementations, the first subset of the online gaming sessions further includes a third gaming session GS3, and the third gaming session is executed (714) in a second duty cycle that follows the first duty cycle of the first processing slice. The third gaming session GS3 does not share the second duty cycle with any other gaming session. In some implementations, the first subset of the online gaming sessions further includes a third gaming session GS3 and a fourth gaming session GS4. In accordance with the time-sharing processing schedule, the third and fourth gaming sessions dynamically share (716) a second duty cycle of the first processing slice 502A by executing in parallel the third and fourth gaming sessions according to real-time data processing need of the third and fourth gaming sessions. The second duty cycle is distinct from the first duty cycle. More details on executing one or more additional gaming sessions during the first processing slice are discussed above with reference to FIGS. 5C-5E.

In an example, four or more online gaming sessions are processed by the GPU 140. Two of the four or more online gaming sessions are processed by dedicated GPU cores without sharing the dedicated GPU cores with any other online gaming session, e.g., a first online gaming session uses a first GPU core and a second online gaming session using a second GPU core and a third GPU core. Remaining two or more online gaming sessions share a fourth GPU core according to the method 700 of managing processing capability explained above with reference to FIGS. 5-7. Specifically, at least two of the remaining two or more online gaming sessions share a duty cycle of each processing slice of the fourth GPU core, and are executed in parallel according to their respective data processing need.

It should be understood that the particular order in which the operations in FIG. 7 have been described are merely exemplary and are not intended to indicate that the described order is the only order in which the operations could be performed. One of ordinary skill in the art would recognize various ways to manage processing capability of a server system as described herein.

Concurrent Rendering of Multiple Media Streams

FIG. 8A is a block diagram of an example server system 114 including at least an encoder 142 in accordance with some implementations. FIG. 8B is a time diagram 820 of a time interval in accordance with some implementations. FIGS. 8C and 8D are example images 840) and 860 of two distinct media streams that are concurrently displayed at two separate client devices 102 in association with a game scene in accordance with some implementations, respectively. Referring to FIG. 4, the server system 114 includes one or more processing units (e.g., CPU(s) 402, GPU(s) 140 and encoder(s) 142), memory 406, and a data buffer 144 that is optionally part of or separate from the memory 406. The CPU 402. GPU 140 and encoder 142 function together to provide server-side functionalities associated with games (e.g., game application(s) 228), including but not limited to setting up game sessions, storing game state data and other game-related data, processing gameplay inputs, and rendering gameplay outputs on the client devices 102 and/or 104. In some implementations, the CPU 402 is configured to interact with the client device to provide game controller configurations 456, facilitate setting up the game application(s) 228, set up game sessions or spectator review sessions, and/or receive the gameplay inputs. The GPU 140 is configured to obtain the gameplay inputs and generate gameplay multimedia content, e.g., by creating lighting effects and transforming objects every time a scene is redrawn.

The encoder 142 is configured to encode (e.g., standardize or compress) the gameplay multimedia content provided by the GPU 140 to one or more output media streams each having a predetermined media format. Media encoding may be carried out in the encoder 142 based on any of a variety of custom or standard codecs (e.g., H.265/MPEG-H HEVC codecs, H.264/MPEG-4 AVC codecs, H. 263/MPEG4 Part 2 codecs, H.262/MPEG-2 codecs, Microsoft codecs, and Google On2 codecs (e.g., VP6, VP6-E, VP6-S, VP7, VP8, and VP9)) and/or any other suitable codec, including codecs not yet developed as of the filing data of this document. Optionally, the encoder 142 is part of the GPU 140. Optionally, the encoder 142 is distinct from the GPU 140, and the data buffer 144 is coupled between the encoder 142 and the GPU 140. Specifically, the data buffer 144 temporarily stores the gameplay multimedia content generated by the GPU 140 in association with the one or more output media streams. The encoder 142 can retrieve the gameplay multi- media content from the data buffer 144 and encode the retrieved content to the one or more media streams for the purposes of standardizing, enhancing a speed of, or com- pressing the gameplay multimedia content. In some imple- mentations, the encoder 142 includes a plurality of encoder cores 800.

Specifically, the encoder 142 is configured to generate a plurality of media streams including a low latency stream 130 and a normal latency stream 132. The low latency stream 130 corresponds to an online interactive gaming session 116, and has a faster response rate and lower transmission latency than the normal latency stream 132. In some implementations, the normal latency stream 132 also corresponds to the online interactive gaming session 116. In some implementations, the normal latency stream 132 is independent of the low latency stream 130, and can be a media stream that is unrelated to any game application. The server system 114 identifies a predetermined frame rate (e.g., 60 fps) for encoding a sequence of image frames of the low latency stream 130. A first time interval (sometimes called a processing slice) is determined to correspond to the pre- defined frame rate for each image frame in the first sequence of image frames of the low latency stream 130. For example, the first time interval is 16.667 ms for a predefined frame rate of 60 fps. Referring to FIG. 8B, the online gaming session 116 includes a plurality of first time intervals each of which is determined according to the predefined frame rate. During each first time interval, an image frame of the first sequence of image frames of the low latency stream 130 is encoded, such that the low latency stream 130 can be outputted at the predefined frame rate.

After the image frame of the low latency stream 130 is encoded, the server system 114 further determines whether a remaining time is left in the respective first time interval. In some situations, it is determined that the remaining time left in the first time interval satisfies a normal latency requirement associated with the normal latency stream 132, and a subset of the second sequence of image frames of the normal latency stream is encoded during the remaining time of the first time interval. Conversely, in some situations, it is determined that the remaining time left in the first time interval does not satisfy the normal latency requirement, the server system 114 aborts generating any image frame of the second sequence of image frames during the remaining time of the first time interval. As such, an encoding priority is granted to the low latency stream 130, and the normal latency stream 132 is generated according to the capability of the encoder 142 without a guarantee of the predefined frame rate.

In some implementations, the low latency stream 130 includes a first image frame, and the subset of the second sequence of image frames of the normal latency stream 132 corresponding to the first image frame includes part of an image frame in the normal latency stream 132 as permitted by the normal latency requirement. After encoding the first image frame, the server system 114 determines the first remaining time left in the first time interval. It is determined that the first remaining time left in the first time interval satisfies the normal latency requirement associated with the normal latency stream. The encoder 142 generates the part of the image frame in the normal latency stream during the remaining time of the first time interval. For example, the part of the image frame includes half of the image frame in the normal latency stream. In accordance with the normal latency requirement, the first remaining time must be suffi- cient to encode at least a quarter of an image frame of the normal latency stream, which takes about 2 ms to encode. The first remaining time must be 2 ms or longer according to the normal latency requirement. In this example, the first remaining time is roughly 5 ms, half of the image frame in the normal latency stream is therefore encoded in compli- ance with the normal latency requirement.

In some implementations, the low latency stream 130 includes a second image frame, and the subset of the second sequence of image frames of the normal latency stream 132 corresponding to the second image frame includes two or more image frames in the normal latency stream 132. After encoding the second image frame, the server system 114 determines the first remaining time left in the first time interval. It is determined that the first remaining time left in the first time interval satisfies the normal latency require- ment associated with the normal latency stream. The encoder 142 thereby generates the two or more image frames in the normal latency stream during the remaining time of the first time interval. For example, the normal latency requirement may require that the first remaining time must be sufficient to encode an integer number of image frames of the normal latency stream. It takes approximately 2 ms to encoder each image frame of the normal latency stream. When the remaining time of the first time interval is 5 ms, two image frames of the normal latency stream 132 are encoded within the remaining time of the first time interval.

In some implementations, after the encoder 142 generates the subset of the second sequence of image frames of the normal latency stream during the remaining time of the first time interval, the server system 114 determines a second remaining time left in the first time interval. It is determined that the second remaining time left in the first time interval satisfies a third requirement associated with a third media stream. Then, the encoder 142 generates a subset of the third media stream during the second remaining time of the first time interval. In some implementations, the third media stream includes a player demo video stream that captures a game player playing the online gaming session. The player demo video stream optionally provides real-time commen- taries created by the game player while the game player is playing the online interactive session 116.

Referring to FIG. 8C, in some implementations, the low and normal latency streams 130) and 132 are related to the same online gaming session 116. The low latency stream 130 has a first resolution (e.g., 4K), and the normal latency stream 132 has a second resolution (e.g., 1080p) that is lower than the first resolution. The low latency stream 130 is sent to a first client device of a game player for enabling a plurality of interactive game actions (e.g., shooting, run- ning, car-racing) by the game player during the online interactive gaming session 116. The normal latency stream 132 is sent to one or more second client devices to allow one or more spectators to review the online interactive session 116 in real time. In some implementations, the low latency stream 130 is provided to a frontend server 134 that is configured to distribute the stream 130 to the game player who has subscribed to gaming service via the frontend server 134. The normal latency stream 132 is provided to a media streaming server 124 that is configured to broadcast the normal latency stream 132 to the spectators who have subscribed to reviewing service via the media streaming server 124. Optionally, the frontend server 134 and media streaming server 124 are managed by an entity using a single gaming application. Optionally, the frontend server 134 and media streaming server 124 are managed by two distinct entities using two distinct end applications, such as a gaming application (e.g., a FIFA Soccer app) and a media streaming application (e.g., YouTube). Optionally, the frontend server 134 and media streaming server 124 can also be managed by a single entity using two distinct end applications.

In some implementations, each of the second client devices does not simply display the normal latency stream 132 that replicates what is displayed on the first client device of the game player with a lower resolution, a higher transmission latency or a slower response rate. Rather, additional information related to the game play is also presented to the spectators concurrently with what is displayed on the first client device of the game player. For example, a camera is used to capture image data of the game player (i.e., a player demo video stream) while the game player is playing the online gaming session 116. The player demo video stream can include real-time commentaries created by the game player while the game player is playing the online interactive session 116. The server system 114 obtains the player demo video stream that is captured of the game player. Optionally, the player demo video stream is incorporated into the normal latency stream 132 that is sent to the second client devices of the spectators. Optionally, the player demo video stream is sent separately to a respective client device but played with the normal latency stream 132. The player demo video stream is played to the one or more spectators concurrently with the normal latency stream of the online interactive session 116. In some situations, the player demo video stream is played in an embedded window 862 of each of the second client devices while the normal latency stream 130 is displayed on the respective second client device.

Alternatively, in some implementations, a player demo audio stream is recorded of the game player while the game player is playing the online gaming session. Optionally, the player demo audio stream is incorporated into the normal latency stream 132 that is sent to the second client devices of the spectators. Optionally, the player demo audio stream is sent separately to each of the second devices and played in conjunction with the normal latency stream 132. The player demo audio stream is played to the one or more spectators concurrently with the normal latency stream 132 of the online interactive session.

In some implementations, the predefined frame rate for encoding the first sequence of image frames of the low latency stream 130 is determined based on the first threshold latency. Further, in some implementations, the normal latency stream 130 has a second latency time that is less than a second threshold latency, and the second threshold latency is greater than the first threshold latency. Particularly, for example, the normal latency stream 132 provided to the spectators is not as sensitive to latency as the low latency stream 130 provided to the game player. In some implementations, both the low latency stream 130 and the normal latency stream 132 correspond to the same online interactive session 116. The low and normal latency streams 130 and 132 have a first response rate and a second response rate for rendering a result of a player action by the game player associated with the online interactive session 116, respectively. The first response rate of the low latency stream 130 is greater than the second response rate of the normal latency stream 132, because the game layer is more sensitive to a latency for rendering the result of the player action than the spectators.

FIG. 9 is a flow diagram illustrating an example method 900 for providing media streams concurrently in accordance with some implementations. Method 900 is, optionally, governed by instructions that are stored in a computer memory or non-transitory computer readable storage medium (e.g., multi-stream generation module 430) of the game server module 426 in FIG. 4) and that are executed by one or more processors of the server system 114 (e.g., the encoder 142 of a game server 122). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 900 may be combined and/or the order of some operations may be changed.

Method 900 is performed by the server system 114 including one or more processing cores (e.g., an encoder 142 that further includes one or more encoder cores 800) and memory storing programs for execution by the processing cores. The server system 114 generates (902) by the encoder 142 a plurality of media streams including a low latency stream 130 and a normal latency stream 132. The low latency stream 130 corresponds to an online interactive session, and has a faster response rate and lower transmission latency than the normal latency stream 132. Specifically, the server system 114 identifies (904) a predefined frame rate for encoding a sequence of image frames of the low latency stream. For each image frame in the first sequence of image frames of the low latency stream, the server system 114 determines (906) a first time interval corresponding to the predefined frame rate. The encoder 142 encodes (908) the image frame during the first time interval.

After encoding the image frame, the server system determines (910) a remaining time left in the first time interval. The server system 114 (in some implementations, the encoder 142 itself) determines whether the remaining time left in the first time interval satisfies a normal latency requirement associated with the normal latency stream. In some situations, in accordance with a determination that the remaining time left in the first time interval satisfies the normal latency requirement, the encoder 142 generates (912) a subset of the second sequence of image frames of the normal latency stream during the remaining time of the first time interval. Alternatively, in some situations, in accordance with a determination that the remaining time left in the first time interval does not satisfy the normal latency requirement, the encoder 142 aborts (914) generating any image frame of the second sequence of image frames during the remaining time of the first time interval.

More details on the method 900 for provide media streams concurrently are discussed above with reference FIG. 8. It should be understood that the particular order in which the operations in FIG. 9 have been described are merely exemplary and are not intended to indicate that the described order is the only order in which the operations could be performed. One of ordinary skill in the art would recognize various ways to manage processing capability of a server system as described herein.

In this application, the method 900 that provides concurrent media streams grants an encoding priority the low latency stream that requires a higher response rate and a lower transmission latency than one or more additional streams, e.g., the normal latency stream. During each of a series of time intervals, an image of the low latency stream is first encoded, and remaining time left in the time interval is not wasted but utilized to encode at least part of the one or more additional media streams. In some implementations, the server system 114 configures the encoder 142 to encode the low latency stream in an efficient manner, such that more remaining time can be left in each time interval for encoding the one or more additional media streams. For example, the encoder 142 of the server system 114 can expedite encoding an image frame of the low latency stream during a corresponding time interval by encoding a portion of the image frame as soon as information required for encoding the portion is provided by the GPU 140, independently of whether other portions of the image frame that are irrelevant to the encoded portion are made available by the GPU 140. As such, the encoder 142 of the server system 114 does not need to wait until the GPU 140 has made available data of the entire image frame, thereby expediting encoding the image frame of the low latency stream and sparing more time in the corresponding time interval for encoding the one or more additional streams distinct from the low latency stream.

Multi-Core Parallel Encoding

Figure 10A:
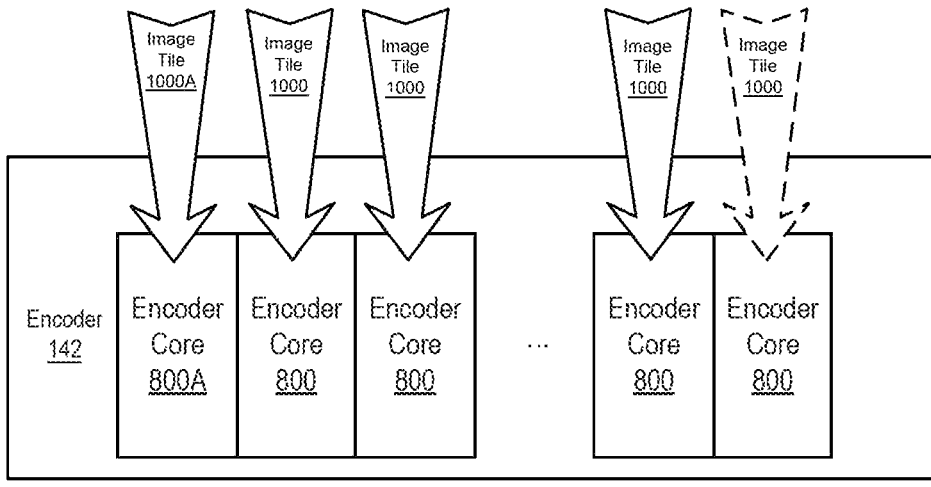
FIG. 10A is a block diagram of encoder cores that are allocated to process a plurality of image tiles of an image frame in a media stream in accordance with some implementations.
Figure 10B:
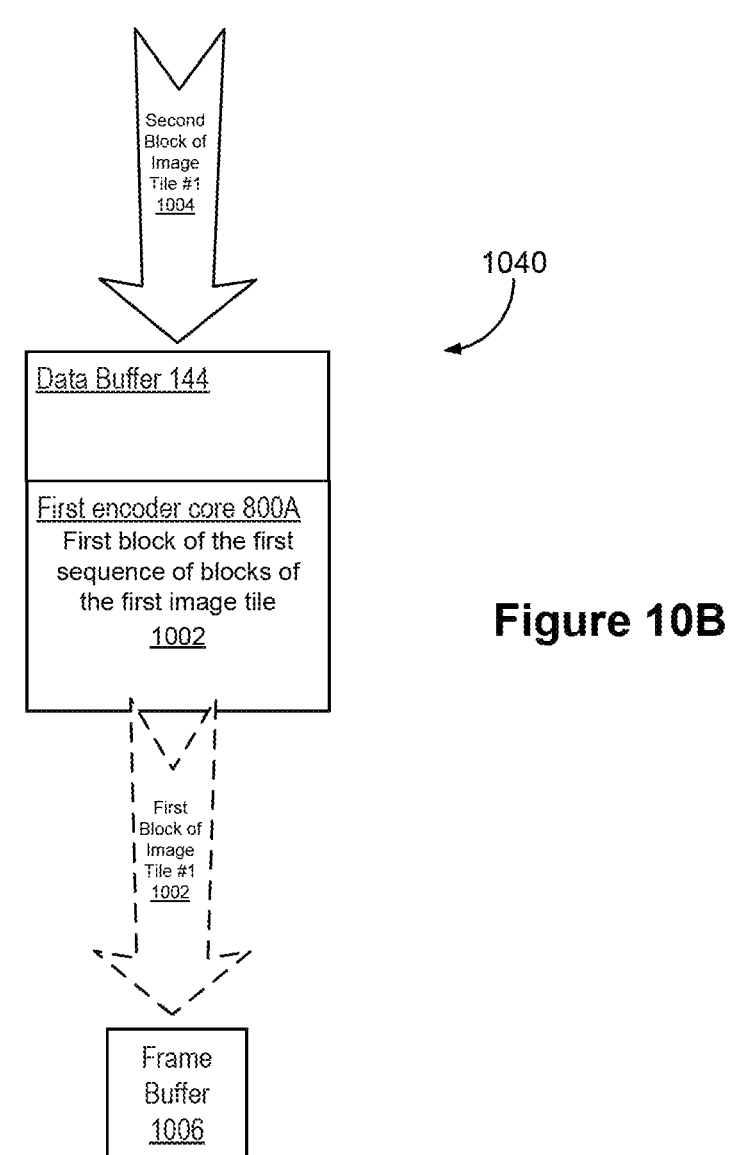
FIG. 10B is an example process of encoding a block of an image tile in accordance with some implementations.

FIG. 10A is a block diagram of encoder cores 800 that are allocated to process a plurality of image tiles 1000 of an image frame in a media stream in accordance with some implementations. FIG. 10B is an example process 1040 of encoding a block in an image tile in accordance with some implementations. Referring to FIGS. 4 and 8A, the server system 114 includes an encoder 142 coupled to a GPU 140, and configured to encode (e.g., standardize or compress) multimedia content provided by the GPU to one or more output media streams each having a predetermined media format. The multimedia content provided by the GPU 140 includes a media stream made of a sequence of image frames. Conventionally, each image frame needs to be prepared by the GPU 140 and stored in a data buffer 144 by its entirety, such that the encoder 142 can retrieve the entire image frame from the data buffer 144 for further encoding. In accordance with some implementations of this application, the encoder 142 is configured to encode a portion of the image frame when information required for encoding the portion is provided by the GPU 140, independently of whether other portions of the image frame that are not needed for encoding the portion are made available or not by the GPU 140.

The encoder 142 includes a plurality of encoder cores 800. The encoder cores 800 of the server system 114 identify frame data of an image frame that are associated with an online gaming session and stored in the data buffer 144. The frame data has a first resolution. The plurality of encoder cores 800 are then allocated to process a plurality of image tiles 1000 of the frame data simultaneously and in parallel, and the plurality of image tiles 1000 are defined in accordance with a rendering specification of the image frame. The plurality of image tiles 1000 includes a first image tile 1000A assigned to a first encoder core 800A, and the first image tile 1000A includes a first sequence of blocks. The encoder cores 800 (e.g., the first encoder core 800A) start to encode the image frame based on a determination of availability of partial frame data, rather than waiting to start encoding the image frame after the frame data for the entire image frame are available.

Specifically, in some implementations, the first encoder core 800A obtains from the data buffer 144 a first block 1002 of the first sequence of blocks of the first image tile 1000A assigned to the first encoder core 800A. The first encoder core 800A also obtains boundary information of the first block 1002. While or prior to obtaining from the data buffer 144 a second block 1004 that follows the first block in the first sequence of blocks, the first encoder core 800A encodes the first block 1002 of the first sequence of block based on the boundary information. The encoded first block 1002 is transmitted to a client device of a user associated with the online gaming session. Optionally, the second block 1004 is directly adjacent to the first block in the image frame. Optionally, the second block 1004 is not directly adjacent to the first block in the image frame.

In some implementations, the encoded first block 1002 is temporarily stored in a frame buffer 1006 of the client device prior to being displayed on the client device. Here, the second block 1004 is not involved in the operation of encoding the first block 1002, and therefore, the first block 1002 can be encoded as soon as the first block and the corresponding boundary information are available and regardless of whether the second block 1004 is available or not in the data buffer 144 (i.e., the second block 1004 may have already been available in the data buffer 144 or have not been provided by the GPU 140 yet). In some situations, while the first block is being obtained from the data buffer 144, the second block has not been stored or ready in the data buffer 144, and is being loaded by the GPU to the data buffer 144. Further, in some situations, while the first block is being encoded in the first encoder core 800A, the second block has already been available in the data buffer 144, and a third block is being loaded by the GPU 140 to the data buffer 144. The third block is encoded subsequently after the first block 1002 and the second block 1004 are encoded.

In some implementations, the boundary information of the first block 1002 is provided by a first subset of blocks in the first image tile 1000A. Optionally, each of the first subset of blocks precedes or follows the first block 1002 in the first sequence of blocks. Further, in some implementations, the first image tile 1000A includes a second subset of blocks that does not share any block with the first subset of blocks, and the first block 1002 is encoded independently of whether the first encoder core 800A has obtained or encoded any of the second subset of blocks. Optionally, the second subset of blocks include the second block 1004.

In some implementations, the server system 114 determines that the boundary information of the first block 1002 is not provided by a third block of a second image tile that is distinct from the first image tile and allocated to a respective encoder core 800. The first block 1002 is encoded independently of whether the respective encoder core assigned to process the second image tile has received or encoded the third block. Stated another way, when the first block 1002 is encoded by the first encoder core 800A, the third block may have been encoded by the respective encoder core, have not been stored and made available in the data buffer 144 yet, or be waiting in the data buffer 144 to be encoded in the respective encoder core.

In some implementations, each image tile 1000 of the image frame includes a respective sequence of blocks, and each block is made of one or more macroblocks each of which is a basic processing unit in a corresponding image and video compression format based on a linear block transform (e.g., discrete cosine transform (DCT)). That said, each of the first sequence of blocks in the first image tile includes a number of macroblocks (e.g., a single macroblock, two or more macroblocks). In an example, a macroblock consists of 16×16 pixels, and is further subdivided into transform blocks (e.g., 16×16 luma (Y) blocks and 8×8 chroma (Cb and Cr) blocks) or prediction blocks (e.g., 4×4 or 16×16 blocks for inter-prediction or intra-prediction).

The first block 1002 needs to be stored in the data buffer 144 until it is encoded or until any block that uses the first block 1002 as boundary information is encoded. Stated another way, the first block 1002 can be purged from the data buffer 144 after both the first block 1002 itself and any block that uses the first block 1002 as boundary information have been encoded. The data buffer 144 is therefore spared for use in storage of other blocks in the image frame, and does not need to have a size that can accommodate all blocks in the image frame. As a result, the size of the data buffer 144 can be reduced while the image frame can still be encoded in the encoder 142 in an efficient manner (largely because the encoder 142 does not require frame data to be available for the entire image frame any more).

Figure 11A:
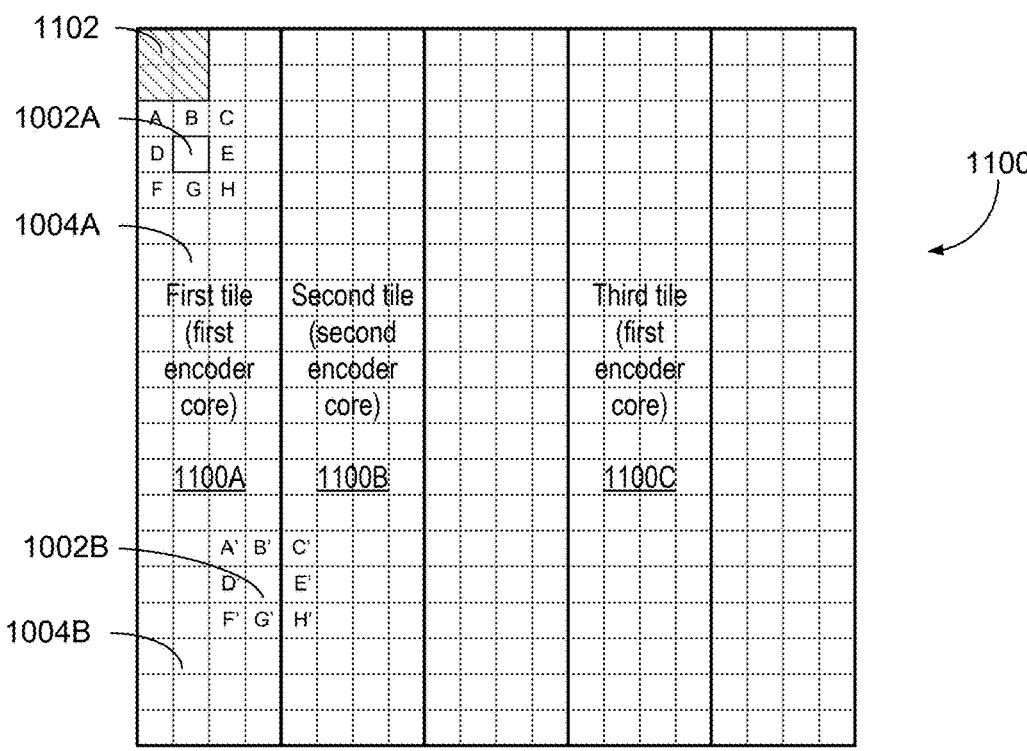
FIGS. 11A-11C are examples image tiles of an image that are defined according to a rendering specification for frame data of an image frame associated with an online interactive session in accordance with some implementations.
Figure 11B:
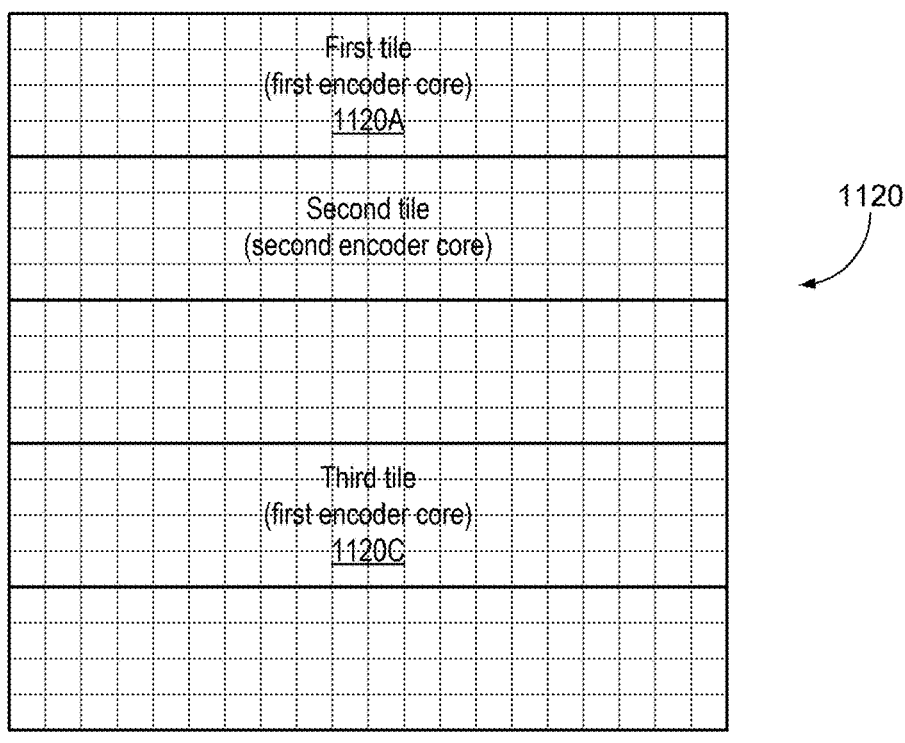
Figure 11C:
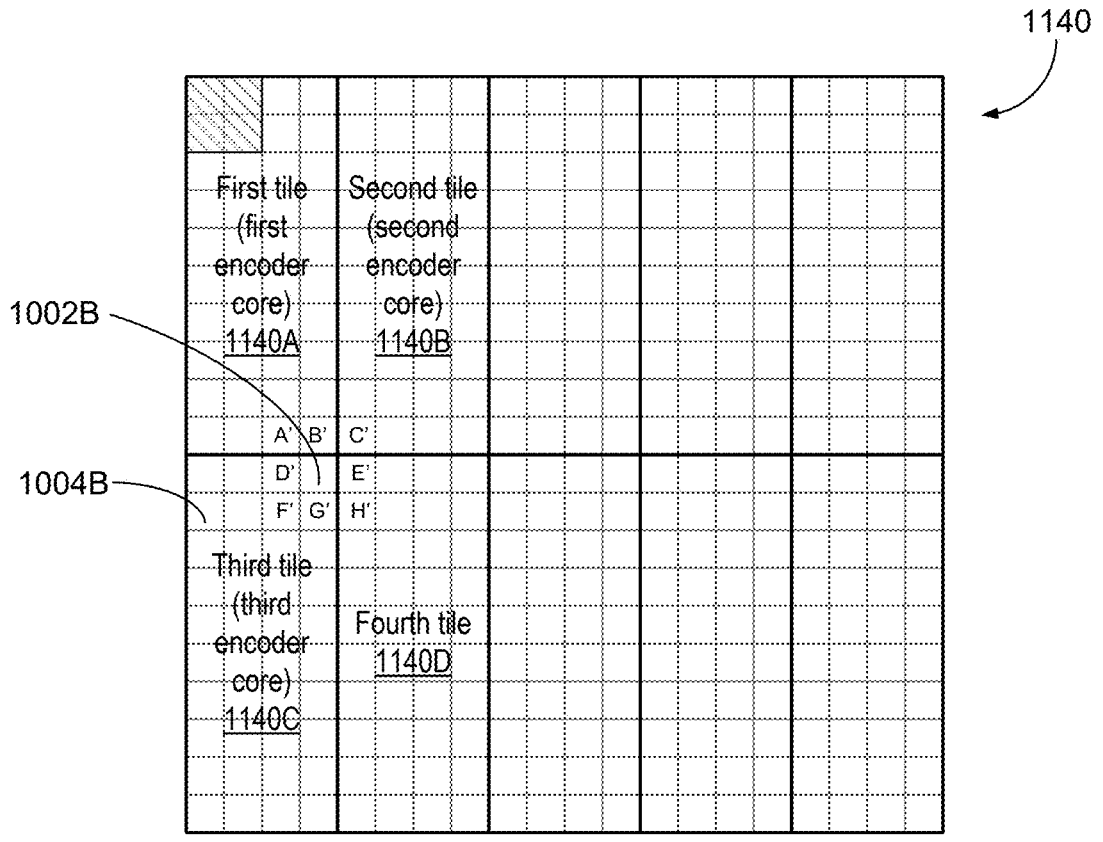

FIGS. 11A-11C are examples image tiles 1100, 1120 and 1140 that are defined according to a rendering specification for frame data of an image frame associated with an online interactive session in accordance with some implementations. As explained above, frame data of an image frame can be partitioned to a plurality of image tiles in accordance with the rendering specification. Referring to FIG. 11A, in some implementations, the frame data of the image frame are partitioned to a single row of image tiles 1100 according to a first rendering specification. Each image tile 1100 includes a number of pixel columns extending from top to bottom in the image frame. In a specific example, media encoding is carried out in the encoder 142 based on a standard VP8 codec, and in accordance with the VP8 codec, the first rendering specification defines that each image frame encoded by the encoder 142 is partitioned to eight tiles that are arranged in a single row and span the full height of the image frame. In some implementations, a basic processing unit of the encoder 142 includes one or more macroblocks 1102. Each of the tiles 1100 includes a first number of macroblock columns of the image frame and a second number of macroblock rows. Each tile 1100 extends from the top to the bottom of the image frame, so the second number of macroblock rows of the respective image tile 1100 is equal to the number of macroblock rows in the image frame.

Referring to FIG. 11B, in some implementations, the frame data of the image frame are partitioned to a single column of image tiles 1120 according to a second rendering specification. Each image tile 1100 includes a number of pixel rows extending from a left edge to a right edge of the image frame. In some implementations, a basic processing unit of the encoder 142 includes one or more macroblocks 1102, and the frame data of the image frame are partitioned to a single column of tiles 1120 in accordance with the second rendering specification. Each of the tiles 1100 includes a first number of macroblock columns of the image frame and a second number of macroblock rows. Each tile 1100 extends from the left side to the right side of the image frame, so the first number of macroblock columns of the respective image tile 1100 is equal to the number of macroblock columns in the image frame.

Referring to FIG. 11C, in some implementations, the frame data of the image frame are partitioned to an array of image tiles 1140 according to a third rendering specification. The array of image tiles 1140 includes two or more rows of image tiles and two or more columns of image tiles (e.g., two rows and five columns of image tiles).

In some implementations, the number of tiles partitioned from the frame data is equal to the number of encoder cores 800 in the encoder 142. In an example, the image frame includes eight tiles, and the encoder 142 includes eight encoder cores 800. In some circumstances, each of the plurality of encoder cores 800 can be assigned to process a distinct tile of the plurality of tiles 1100 partitioned from the frame data of the image frame. Alternatively, in some circumstances, an encoder core 800A is allocated to process two or more of the tiles (e.g., 1100A and 1100C in FIG. 11A, 1120A and 1120C in FIG. 11B) while one of the plurality of encoder cores 800 is not assigned to process any of the tiles.

In some implementations, the number of tiles partitioned from the frame data can be greater than the number of encoder cores 800 in the encoder 142. At least one encoder core 800 is allocated to process two or more of the tiles (e.g., 1100A and 1100C in FIG. 11A, 1120A and 1120C in FIG. 11B). In some circumstances, one of the plurality of encoder cores 800 may not be assigned to process any of the tiles even though the number of image tiles is greater than the number of cores.

Further, in some implementations, the number of tiles partitioned from the frame data can be less than the number of encoder cores 800 in the encoder 142. In some circumstances, each of a subset of the encoder cores 800 is assigned to process a distinct tile of the plurality of tiles partitioned from the frame data of the image frame. At least one encoder core 800 is not assigned to process any of the tiles while in some circumstances, an encoder core 800A is still allocated to process two or more of the tiles (e.g., 1100A and 1100C in FIG. 11A, 1120A and 1120C in FIG. 11B).

In some implementations, the number of tiles partitioned from the frame data is independent of the number of encoder cores 800 in the encoder 142. Alternatively, in some implementations, the rendering specification is associated with the number of encoder cores 800 in the encoder 142, and the number of image tiles is determined according to the number of encoder cores 800 in the encoder 142.

In some implementations, boundary information needed to encode a first block 1002A of the first image tile 1000A includes one or more blocks in the same first image tile 1000A (FIG. 11A). Optionally, each of the one or more blocks is either directly adjacent to the first block 1002A or located anywhere in the first image tile 1000A. In an example, the one or more blocks include all eight blocks surrounding the first block 1002 including an upper left block A, an above block B, an upper right block C, a left block D, a right block E, a lower left block F, a bottom block G, and a lower right block H. In another example, the one or more blocks include only adjacent blocks, i.e., the above block B, the left block D, the right block E, and the bottom block G. The first block 1002A is encoded after information of the one or more blocks are received from the data buffer 144. The second block 1004A is obtained from the data buffer 144 while or after the first block 1002A is encoded, so the second block 1004 is also obtained after the one or more blocks are obtained as the boundary information of the first block 1002A.

Further, in some implementations, boundary information needed for encoding a first block 1002B of the first image tile 1000A includes one or more blocks. Because the first block 1002B is close to a boundary of the first image tile 1000A, the one or more blocks used to encode the first block 1002B belong to two or more image tiles. Optionally, each of the one or more blocks is either directly adjacent to the first block 1002A or located anywhere in one of the two or more image tiles. In an example, the one or more blocks include all eight blocks surrounding the first block 1002B including an upper left block A', an above block B', an upper right block C', a left block D', a right block E', a lower left block F', a bottom block G' and a lower right block H'. Referring to FIG. 11A, the one or more blocks include a first subset of blocks of the first image tile 1100A (e.g., blocks A', B', D', F' and G') and a second subset of blocks of the second image tile 1100B (i.e., C', E' and H'). Referring to FIG. 11C, boundary information needed to encode a first block 1002B of a third image tile 1140C includes one or more blocks that further include four subsets of blocks. Each of the four subsets of blocks belongs to the first, second, third and fourth image tiles (i.e., blocks A' and B' in the first image tile 1140A: block C' in the second image tile 1140B: blocks D'. F' and G' in the third image tile 1140C; and blocks E' and H' in the fourth image tile 1140D), respectively.

In another example, the one or more blocks corresponding to the first block 1002 include only adjacent blocks, i.e., the above block B', the left block D', the right block E' and the bottom block G'. Referring to FIG. 11A, the one or more blocks include a first subset of blocks of the first image tile 1100A (e.g., blocks B, D' and G') and a second subset of blocks of the second image tile 1100B (i.e., E'). Referring to FIG. 11C, boundary information needed to encode a first block 1002B of a third image tile 1140C includes one or more blocks that further include three subsets of blocks. Each of the three subsets of blocks belongs to the first, third and fourth image tiles (i.e., block B' in the first image tile 1140A, blocks D' and G' in the third image tile 1140C, and block E' in the fourth image tile 1140D), respectively. The first block 1002B still needs to wait for information of the one or more blocks to be received from the data buffer 144 before it can be encoded by the corresponding encoder core. The second block 1004B is obtained from the data buffer 144 while or after the first block 1002B is encoded, so the second block 1004B is also obtained after the one or more blocks are obtained as the boundary information of the first block 1002B.

Figure 12A:
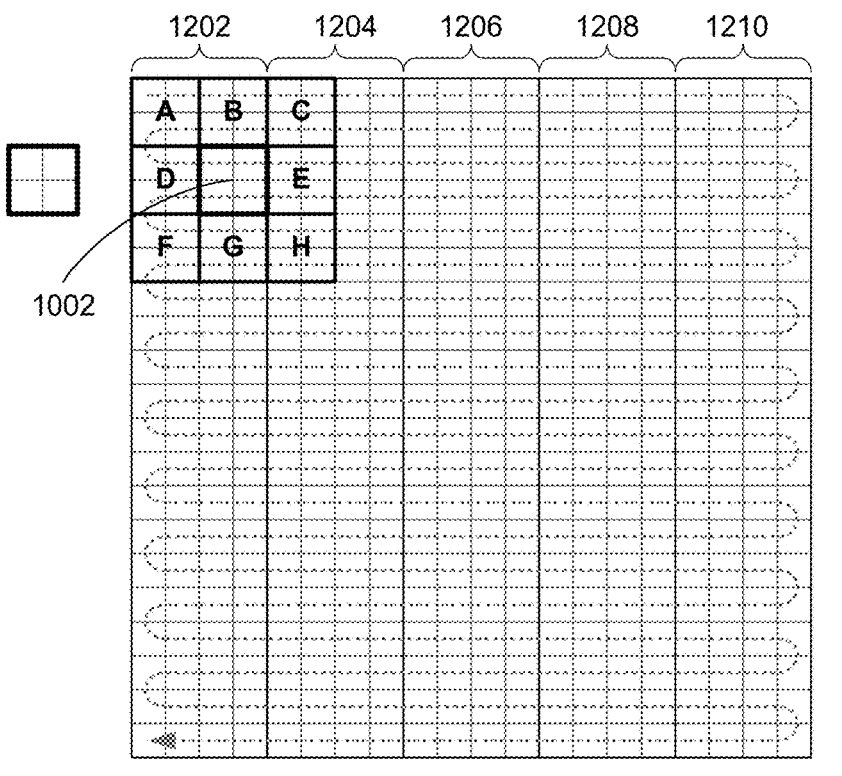
FIGS. 12A-12C are examples raster scans of an image associated with an online interactive session in accordance with some implementations.
Figure 12B:
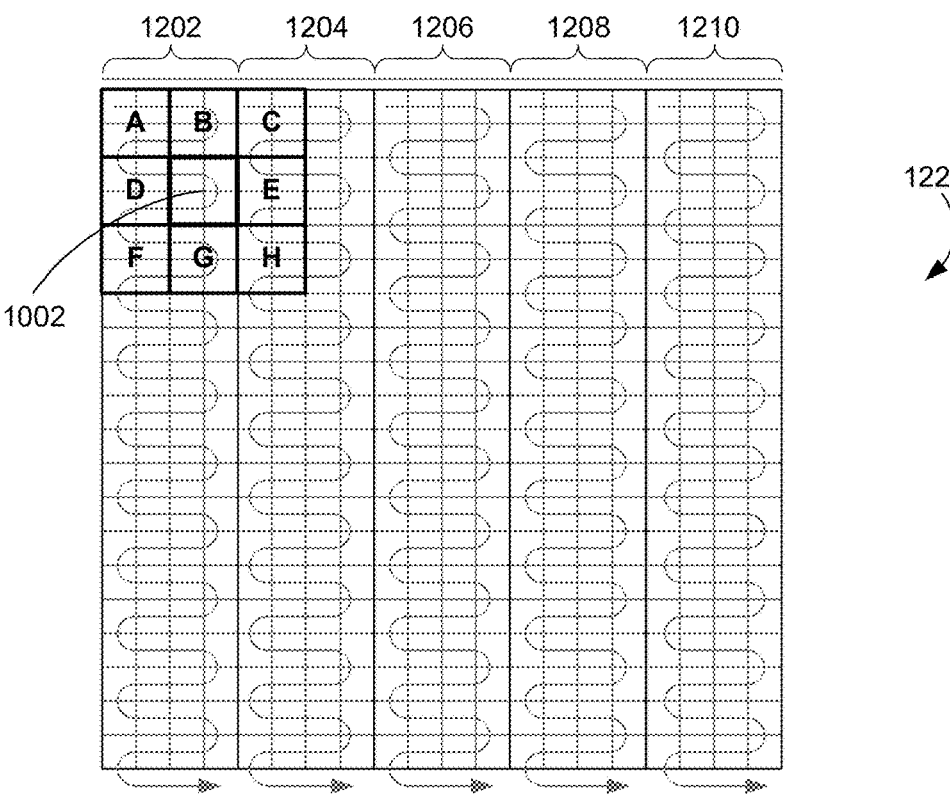
Figure 12C:
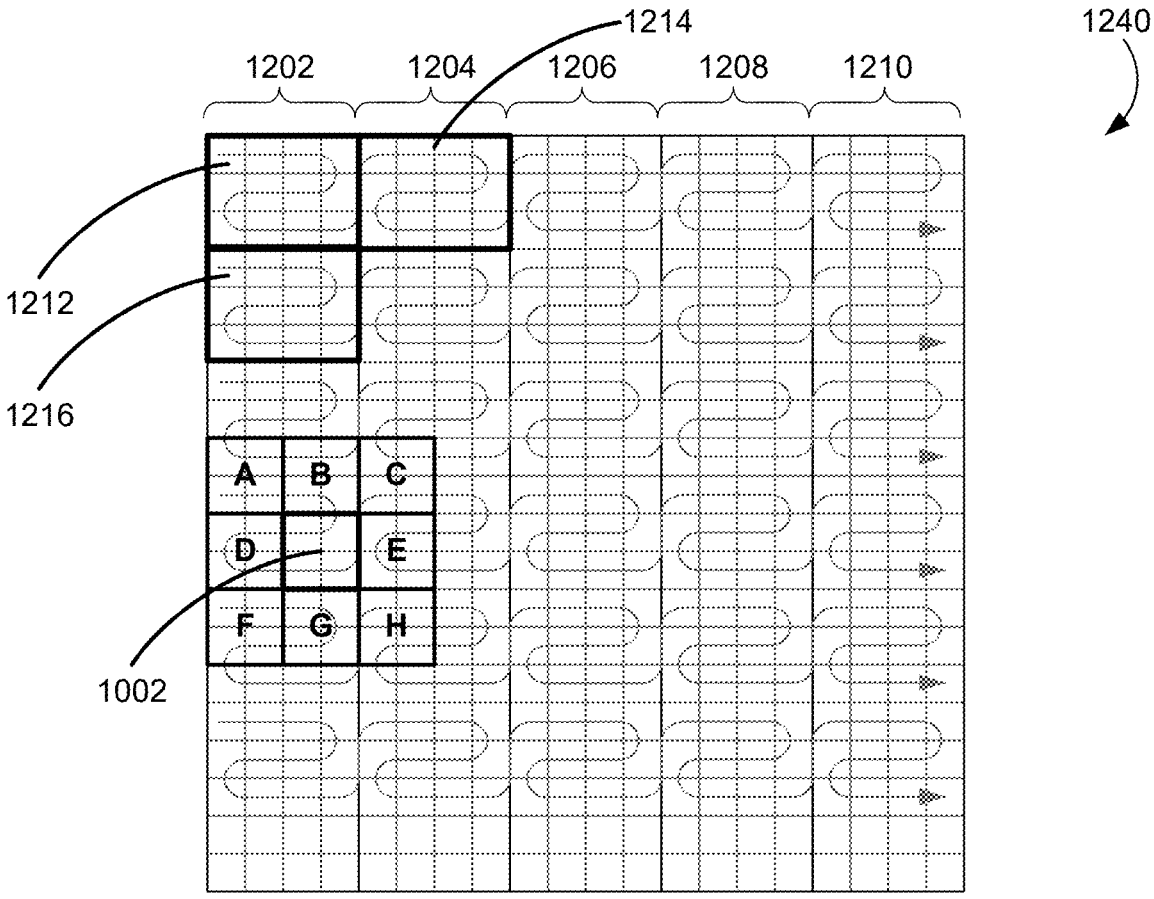

FIGS. 12A-12C are examples raster scans 1200, 1220 and 1240 of frame data of an image frame associated with an online interactive session in accordance with some implementations. The GPU 140 generates each picture element (e.g., pixel) of the image frame according to a predetermined raster order, and stores data corresponding to the respective picture element into the data buffer 144, thereby making the data of the respective picture element available to the encoder 142 according to the predetermined raster order. The encoder 142 thereby extracts the frame data of the image frame by a raster scan of the data buffer when the data of each picture element is available, i.e., according to the predetermined raster order. As explained above, each encoder core 800 is configured to encode blocks of a respective image tile sequentially, and for example, a first encoder core 800A obtains and encodes a sequence of blocks (e.g., a first block 1002 and a second block 1004) of a corresponding first image tile 1000A. Particularly, a block of each image tile is encoded when information required for encoding the block is provided by the GPU 140, independently of whether other blocks of the image frame that are not needed for encoding the block are made available or not in the data buffer by the GPU 140. That said, in an example, the frame data includes data of picture elements (e.g., pixels) corresponding to the first and second blocks 1002 and 1004, and the first and second blocks 1002 and 1004 are obtained while the data of the picture elements corresponding to the first and second blocks 1002 and 1004 are extracted in accordance with the predetermined raster order.

Referring to FIG. 12A, in accordance with a first predetermined raster order, the GPU 140 generates each pixel of the image frame row by row and stores data corresponding to the respective pixel into the data buffer 144 row by row. While the frame data of the image frame are being made available in the data buffer 144, they are also extracted from the data buffer 144 row by row according to the first predetermined raster order. Each row of the image frame includes data from two or more image tiles. For example, the frame data of the image frame are partitioned to a single row of image tiles 1100 (e.g., including 5 image tiles 1202-1210). Data of pixels on each odd row of the image frame are made available from a left side to a right side of the image frame, i.e., sequentially for image tiles 1202, 1204, 1206, 1208 and 1210. In contrast, data of pixels on each even row of the image frame are made available in a reserve order and from the right side to the right side of the image frame, i.e., sequentially for image tiles 1210, 1208, 1206, 1204 and 1202.

In some implementations, to encode the first block 1002, the first encoder core 800A obtains the first block 1002 and the corresponding boundary information including one or more blocks A-H. Optionally, a first subset or all of the one or more blocks A-H belong to the same first image tile 1202, which includes the first block 1002. Optionally, a second subset of the one or more blocks A-H (e.g., blocks C, E and H in FIG. 12A) belong to a second image tile 1204 distinct from the first image tile 1202. Each of the first block 1002 and the one or more blocks A-H includes one or more picture elements, e.g., 4, 16 or 256 pixels. In the example of FIG. 12A, the first encoder core 800A has to obtain at least data of all picture elements of the first block 1002 and blocks A-F, before it encodes the first block 1002. The first encoder core 800A obtains the first block 1002 after it extracts the first four rows of the image frame from the data buffer 144. However, the first encoder core 800A does not encode the first block 1002 immediately. Rather, the raster scan of the data buffer 144 continues, and the first encoder core 800A starts to encode the first block 1002 after it completely obtains data of the block F when the raster scan reaches the sixth row of the image frame.

When more and more rows of picture elements are made available and extracted from the data buffer 144, the encoder coder cores 800 of the encoder 142 start to encode blocks within their corresponding image tiles in parallel, from top to bottom in the image frame, without awaiting the frame data of the entire image frame to be made available. This parallel encoding mechanism cuts down a total wait time of the encoder 142 and reduces an encoding time needed for the image frame. In an example, the encoder 142 identifies a predefined frame rate (e.g., 60 fps) for encoding a sequence of image frames of a low latency stream, and determines a first time interval (e.g., 16.67 ms) corresponding to the predefined frame rate. During each first time interval, if the encoding time needed for an image frame is reduced, a remaining time left in the first time interval could be extended for encoding a subset of a second sequence of image frames of a normal latency stream, thereby allowing concurrent encoding of two or more media streams, e.g., two distinct media streams that are concurrently displayed at two separate client devices in association with a game scene as shown in FIG. 8C.

Referring to FIG. 12B, in accordance with a second predetermined raster order, the GPU 140 generates the image tiles 1202-1210 of an image frame sequentially, e.g., generates the first image tile 1202 before the second image tile 1204 that is adjacent to the first image tile 1202. For each image tile, the GPU 140 generates pixels in the respective image tile row by row and stores data corresponding to the pixels in the respective image tile into the data buffer 144 row by row until all pixels of the respective image tile are generated and stored. While the frame data of the image frame are being made available in the data buffer 144, they are also extracted from the data buffer 144 by the encoder 142 in accordance with the second predetermined raster order. Specifically, the encoder 142 sequentially extracts the image tiles 1202-1210 of the frame data of the image frame, and for each image tile, the pixels of each image tile row by row after they are made available by the GPU 140. For example, while data of pixels in the first image tile 1202 are being made available in the data buffer 144 by the GPU 140 from top to bottom in a zigzag raster order, the data of pixels are extracted from the data buffer 144 by the corresponding encoder core 800A from top to bottom in the same zigzag raster order. As a result, after data of the entire first image tile 1202 have been made available and extracted, the GPU 140 continues to generate and store data of pixels in each of the other image tiles 1204-1210 sequentially from top to bottom in the zigzag raster order, and the encoder 142 follows the GPU 140 to extract from the data buffer 144 the data of the pixels in the respective image tile from top to bottom in the zigzag raster order.

In some implementations shown in FIG. 12B, the first encoder core 800A obtains the first block 1002 and the corresponding boundary information including one or more blocks A-H. The first encoder core 800A has to obtain at least data of all picture elements of the first block 1002 and blocks A-F, before it encodes the first block 1002. Optionally, a second subset of the one or more blocks A-H (e.g., blocks C, E and H in FIG. 12B) belong to a second image tile 1204, which is distinct from but adjacent to the first image tile 1202. The first encoder core 800A obtains the first block 1002 after the first encoder core 800A extracts the first four rows of the first image tile 1202 from the data buffer 144. However, the first encoder core 800A does not encode the first block 1002 immediately. Rather, the raster scan of the data buffer 144 continues, and the first encoder core 800A starts to encode the first block 1002 after it completely obtains data of the block F when the raster scan reaches the sixth row of the second image tile 1204.

In some implementations not shown in this application, the first image tile 1202 includes both the first block 1002 and the one or more blocks A-H. The first encoder core 800) encodes the first block 1002 after it completely obtains the picture elements of the first block 1002 and the blocks A-H within the first image tile. To encode the first block 1002, the raster scan is limited to the first image tile 1202 independently of the other image tiles 1204-1210, e.g., the first encoder core 800A does not need to wait until the raster scan is finished for all blocks in the first image tile 1202 or reaches any block in the second image tile 1204.

When more and more image tiles and rows of picture elements in each tile are made available and extracted from the data buffer 144, the encoder coder cores 800 of the encoder 142 start to encode blocks from top to bottom within their corresponding image tiles without awaiting the frame data of the entire image frame to be made available. The first predetermined raster order shown in FIG. 12A allows the encoder cores allocated to process the image tiles to complete encoding of respective image tiles at completion times that are substantially close to each other. In contrast, the second predetermined raster order shown in FIG. 12B allows the first encoder core 800A to start and complete encoding of the first image tile 1202 earlier than other encoder cores 800 that are allocated to process image tiles that are made available subsequently to the first image tile 1202. After encoding blocks in the first image tile 1202, the first encoder core 800A can be allocated to encode another image tile (e.g., the image tile 1210) in the same image frame or a subset of a distinct image frame, thereby allowing concurrent encoding of image frames of two or more media streams, e.g., two distinct media streams that are concurrently displayed at two separate client devices in association with a game scene as shown in FIG. 8C.

Referring to FIG. 12C, each of the image tiles 1202-1210 in the image frame includes a plurality of segments, and each segment includes a first number of rows. In accordance with a third predetermined raster order, the GPU 140 generates the segments in the image tiles 1202-1210 row by row, e.g., generates a first segment 1212 of the first image tile 1202 before the first segment 1214 of the second image tile 1204. For each segment of each image tile, the GPU 140 generates the first number of rows of pixels in the respective segment row by row and stores data corresponding to the pixels in the respective segment of the image tile into the data buffer 144 row by row until all pixels of the respective segment are generated and stored. While the frame data of each segment of the image frame are being made available in the data buffer 144, they are also extracted from the data buffer 144 by the encoder 142 in accordance with the second predetermined raster order.

Specifically, the encoder 142 sequentially extracts the segments of the image tiles 1202-1210 of the frame data of the image frame row by row. For each segment in each image tile, the encoder 142 extracts the pixels of each segment row by row and in a zigzag raster order, after they are made available by the GPU 140. For example, while data of pixels in a first segment 1212 of the first image tile 1202 are being made available in the data buffer 144 by the GPU 140 from top to bottom and in a zigzag raster order, the data of pixels are extracted from the data buffer 144 by the corresponding encoder core 800A from top to bottom and in the same zigzag raster order. As a result, after data of the first segment 1212 of the first image tile 1202 have been made available and extracted, the GPU 140) continues to generate and store data of pixels in a first segment 1214 of the second image tile 1204 from top to bottom and in the zigzag raster order, and the encoder 142 follows the GPU 140 to extract from the data buffer 144 the data of the pixels in the first segment 1214 of the second image tile 1204. A second segment 1216 of the first image tile 1202 that follows the first segment 1212 is made available and extracted after all first segments of the image tiles 1202-1210.

To some extent, the third predetermined raster order is a combination of the first and second predetermined raster order shown in FIGS. 12A and 12B. It is also noted that the zigzag raster order is merely an example of an internal raster order applied to scan the pixels in each segment of the image tiles 1202-1210, and that the internal raster order is not limited to the zigzag raster order.

In some implementations shown in FIG. 12C the first encoder core 800A obtains the first block 1002 and the corresponding boundary information including one or more blocks A-H. The first encoder core 800A has to obtain at least data of all picture elements of the first block 1002 and blocks A-F, before it encodes the first block 1002. Optionally, a second subset of the one or more blocks A-H (e.g., blocks C, E and H in FIG. 12B) belong to a second image tile 1204, which is distinct from but adjacent to the first image tile 1202. The first encoder core 800A obtains the first block 1002 after the first encoder core 800A extracts the fourth segment in the first image tile 1202 from the data buffer 144. However, the first encoder core 800A does not encode the first block 1002 immediately. Rather, the raster scan of the data buffer 144 continues, and the first encoder core 800A starts to encode the first block 1002 after it completely obtains data of the block H when the raster scan reaches the fifth segment of the second image tile 1204.

FIG. 13 is a flow diagram illustrating an example method 1300 for encoding a media stream in accordance with some implementations. Method 1300 is, optionally, governed by instructions that are stored in a computer memory or non-transitory computer readable storage medium (e.g., parallel encoding module 432 of the game server module 426 in FIG. 4) and that are executed by one or more processors of the server system 114 (e.g., the encoder 142 of the game server 122). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 1300 may be combined and/or the order of some operations may be changed.

Method 1300 is performed by the server system 114 for encoding a media stream. The server system 114 includes a GPU 140, a plurality of encoder cores 800, a data buffer 144, and memory storing programs for execution by the GPU 140 and the encoder cores 800. The encoder cores 800 identify (1302) at least part of frame data of an image frame associated with an online gaming session and stored in the data buffer 144 when the at least part of the frame data is made available. Optionally, the frame data has a first resolution.

The plurality of encoder cores 800 are allocated (1304) to process a plurality of image tiles of the frame data simultaneously and in parallel. The plurality of image tiles are defined in accordance with a rendering specification. In some implementations, in accordance with the rendering specification, the frame data of the image frame is partitioned to a row of image tiles. For example, a rendering specification corresponding to VP8 defines that each image frame is partitioned to eight tiles that are arranged in a single row, and each tile extends from top to bottom in the respective image frame. Stated another way, each image tile includes a number of macroblock columns of the image frame and a number of macroblock rows of each image tile, and the number of macroblock rows of each image tile is equal to a number of macroblock rows of the image frame. Each macroblock is a processing unit in a corresponding image and video compression format based on a linear block transform, and optionally, includes an array of 16×16 pixels or 64×64 pixels. In some implementations, the plurality of image tiles of the frame data include a number of image tiles, and the number of image tiles is determined according to the number of processing cores in the plurality of encoder cores.

The plurality of image tiles includes (1306) a first image tile (e.g., the image tiles 1000A, 1100A, 1120A, 1140A and 1202) assigned to a first encoder core 800A. In some implementations, the first encoder core 800A is assigned to process a third image tile that is not adjacent to the first image tile after encoding the first image tile. The first image tile includes a first sequence of blocks, and each of the first sequence of blocks includes a number (e.g., 1, 2 and 4) of macroblocks.

The first encoder core obtains (1308) from the data buffer a first block 1002 of the first sequence of blocks of the first image tile assigned to the first encoder core. The first encoder core obtains (1310) boundary information of the first block. In some implementations, the boundary information of the first block is provided by a first subset of blocks in the first image tile. Further, the first image tile includes a second subset of blocks that does not share any block with the first subset of blocks, and the first block is encoded independently of whether the first encoder core has obtained or encoded any of the second subset of blocks. In some implementations, the first encoder core determines that the boundary information of the first block is not provided by a third block of a second image tile that is distinct from the first image tile, and encodes the first block independently of whether a respective encoder core that is assigned to process the second image tile has received or encoded the third block.

While or prior to obtaining from the data buffer 144 a second block 1004 that follows the first block in the first sequence of blocks, the first encoder core encodes (1312) the first block 1002 of the first sequence of blocks based on the boundary information. The second block is needed in the boundary information. Optionally, the second block is directly adjacent to the first block. Optionally, the second block is not directly adjacent to the first block. In some implementations, the first block is encoded independently of whether the first encoder core completes obtaining any other encoding block that follows the first block in the first sequence of blocks of the first image tile. In some situations, the second block is being prepared and loaded by the GPU 140 to the data buffer 144 while the first block is being obtained from the data buffer by the first encoder core.

Further, in some implementations, the first image tile further includes a third block. While the first encoder core 800A is encoding the first block, the third block is being loaded to the data buffer 144 by the GPU 140. The third block is encoded subsequently to encoding of the first and second blocks.

The encoded first block 1002 is then transmitted (1314) to a client device of a user associated with the online gaming session. In some implementations, the encoded first block 1002 is transmitted after all blocks of the image frame have been encoded. In some implementations, the encoded first block 1002 is transmitted after a subset of blocks in the image frame have been encoded.

In some implementations, the frame data of the image frame is extracted by the encoder 142 by a raster scan of the data buffer 144 according to a predetermined raster order. The frame data includes data of pixels corresponding to the first and second blocks, and the first and second blocks are obtained while the data of the pixels corresponding to the first and second blocks are extracted in accordance with the predetermined raster order. Further, in some implementations, the frame data of the image frame are extracted from the image frame row by row according to the predetermined raster order, and each row of the image frame includes data from two or more image tiles. Alternatively, in some implementations, the frame data of the image frame further are extracted when data from each image tile are extracted by a respective raster scan, and the plurality of image tiles are sequentially scanned to extract their respective data. In addition, the predetermined raster order includes an internal raster order, and the raster scan within each of the image tiles follows the internal raster order.

Alternatively, in some implementations, each image tile includes a plurality of segments each of which further includes a first number of rows of pixels. In accordance with the predetermined raster order, the segments of the plurality of image tiles of the image frame are scanned row by row, and the pixels in each segment of each image tile is scanned by an internal raster order. In another example, the first number of rows of the first image tile are extracted by the raster scan. After extracting the first number of rows of the first image tile, the encoder 142 extracts the first number of rows of the second image tile by the raster scan. The first number of rows of each of the first and second image tiles are followed by a second number of rows. After extracting the first number of rows of the second image tile, the encoder 142 extracts the second number of rows of the first image tile by the raster scan. After extracting the second number of rows of the first image tile, the encoder extracts the second number of rows of the second image tile by the raster scan. The predetermined raster order includes an internal raster order, and the raster scan within each of the first and second image tiles follows the internal raster order.

More details on extracting the frame data of the image frame from the data buffer are discussed above with reference to FIGS. 12A-12C.

It should be understood that the particular order in which the operations in FIG. 13 have been described are merely exemplary and are not intended to indicate that the described order is the only order in which the operations could be performed. One of ordinary skill in the art would recognize various ways to manage processing capability of a server system as described herein.

In summary, some implementations of this application are directed to GPU virtualization supporting low latency and soft real-time workloads, and more specifically, to a method of managing processing capability of a server system having one or more processing cores that further include multiple processing slices. Upon receiving requests to initiate online gaming sessions, the server system allocates each processing slice of the processing cores to a subset of the online gaming sessions to be executed thereon. A first processing slice is allocated to a first subset of the online gaming sessions including a first gaming session and a second gaming session. At the first processing slice, a time-sharing processing schedule is determined for the first subset of the online gaming sessions. In accordance with the time-sharing processing schedule, the first and second gaming sessions share a duty cycle of the first processing slice, and are executed dynamically and in parallel according to real-time data processing need of the first and second gaming sessions.

Some implementations of this application are directed to concurrent rendering of multiple media streams, and more specifically, to a method of concurrently rendering multiple media streams that includes at least a low latency stream and a normal latency stream. The low latency stream corresponds to an online interactive session, and has a faster response rate and lower transmission latency than the normal latency stream. An encoder processor identifies a predefined frame rate for encoding a sequence of image frames of the low latency stream. For each image frame of the low latency stream, a time interval is determined according to the predefined frame rate, and the image frame is encoded during the time interval. In accordance with a determination whether a remaining time left in the time interval satisfies a normal latency requirement associated with the normal latency stream, the encoder processor optionally generates a subset of image frames of the normal latency stream during the remaining time of the time interval.

Some implementations of this application are directed to multi-core hardware accelerators for real-time video encoding, and more specifically, to a method of encoding a media stream. An encoder processor identifies frame data of an image frame that is associated with an online gaming session, and allocates its encoder cores to process multiple image tiles of the frame data simultaneously and in parallel. The image tiles include a first image tile assigned to a first encoder core and including a first sequence of blocks. The first encoder core obtains a first block of the first image tile and boundary information of the first block. While or prior to obtaining a second block that follows the first block in the first sequence of blocks, the first encoder core encodes the first block of the first sequence of blocks based on the boundary information, and transmits the encoded first block to a client device of a user associated with the online gaming sessions.

Reference have been made in detail to various implementations, examples of which are illustrated in the accompanying drawings. In the above detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

It will be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, without changing the meaning of the description, so long as all occurrences of the first device are renamed consistently and all occurrences of the second device are renamed consistently. The first device and the second device are both device, but they are not the same device.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of encoding a media stream, comprising:

at a server system, wherein the server system includes a GPU, a plurality of encoder cores, a data buffer, and memory storing programs for execution by the GPU and the encoder cores:

allocating the plurality of encoder cores to process in parallel a plurality of image tiles of frame data that is stored in the data buffer and defined in accordance with a rendering specification, the plurality of image tiles comprising a number of image tiles that is based at least in part on a number of encoder cores in the plurality of encoder cores and comprising a first image tile assigned to a first encoder core, the first image tile including a first sequence of blocks; and at the first encoder core:

obtaining from the data buffer a first block of the first sequence of blocks of the first image tile assigned to the first encoder core;

obtaining boundary information of the first block;

while or prior to obtaining from the data buffer a second block that follows the first block in the first sequence of blocks, encoding the first block of the first sequence of blocks based on the boundary information; and transmitting the encoded first block to a client device of a user.

2. The method of claim 1, wherein each of the plurality of image tiles includes a number of macroblock rows of an image frame represented by the frame data, and the number of macroblock rows of each image tile is equal to a number of macroblock rows of the image frame.

3. The method of claim 1, wherein the first encoder core is assigned to process a third image tile that is not adjacent to the first image tile after encoding the first image tile.

4. The method of claim 1, wherein each of the first sequence of blocks includes a number of macroblocks.

5. The method of claim 1, wherein the first block is encoded independently of whether the first encoder core completes obtaining any other encoding block that follows the first block in the first sequence of blocks of the first image tile.

6. The method of claim 1, wherein the boundary information of the first block is provided by a first subset of blocks in the first image tile.

7. The method of claim 6, wherein the first image tile includes a second subset of blocks that does not share any block with the first subset of blocks, and the first block is encoded independently of whether the first encoder core has obtained or encoded any of the second subset of blocks.

8. The method of claim 1, further comprising:

determining that the boundary information of the first block is not provided by a third block of a second image tile, wherein the first block is encoded independently of whether a respective encoder core that is assigned to process the second image tile has received or encoded the third block.

9. The method of claim 1, further comprising:

extracting the frame data from an image frame by a raster scan of the data buffer according to a predetermined raster order, wherein the frame data includes data of pixels corresponding to the first and second blocks, and the first and second blocks are obtained while the data of the pixels corresponding to the first and second blocks are extracted in accordance with the predetermined raster order.

10. The method of claim 9, wherein the frame data of the image frame are extracted from the image frame row by row according to the predetermined raster order, and wherein each row of the image frame includes data from two or more image tiles.

11. The method of claim 9, wherein extracting the frame data of the image frame further comprises extracting data from each image tile by a respective raster scan, and the plurality of image tiles are sequentially scanned to extract their respective data.

12. The method of claim 9, wherein the first image tile is adjacent to a second image tile, and extracting the frame data of the image frame further comprises, in accordance with the predetermined raster order:

extracting a first number of rows of the first image tile by the raster scan;

after extracting the first number of rows of the first image tile, extracting the first number of rows of the second image tile by the raster scan, wherein the first number of rows of each of the first and second image tiles are followed by a second number of rows;

after extracting the first number of rows of the second image tile, extracting the second number of rows of the first image tile by the raster scan; and after extracting the second number of rows of the first image tile, extracting the second number of rows of the second image tile by the raster scan.

13. The method of claim 12, wherein the predetermined raster order includes an internal raster order, and the raster scan within each of the first and second image tiles follows the internal raster order.

14. The method of claim 1, wherein the second block is directly adjacent to the first block.

15. The method of claim 1, wherein the second block is not directly adjacent to the first block.

16. The method of claim 1, further comprising:

while obtaining from the data buffer the first block, loading the second block to the data buffer.

17. The method of claim 1, further comprising:

while encoding the first block, loading a third block to the data buffer, wherein the third block is encoded subsequently to encoding of the first and second blocks.

18. A server system, comprising:

a GPU, a plurality of encoder cores, a data buffer, and memory storing one or more programs for execution by the GPU and encoder cores, the one or more programs comprising instructions for:

allocating the encoder cores to process in parallel a plurality of image tiles of frame data that is stored in the data buffer and defined in accordance with a rendering specification, wherein the plurality of image tiles comprises a number of image tiles that is based at least in part on a quantity of the encoder cores and comprises a first image tile assigned to a first encoder core, and wherein the first image tile includes a first sequence of blocks; and at the first encoder core:

obtaining from the data buffer a first block of the first sequence of blocks of the first image tile assigned to the first encoder core;

obtaining boundary information of the first block;

while or prior to obtaining from the data buffer a second block that follows the first block in the first sequence of blocks, encoding the first block of the first sequence of blocks based on the boundary information; and transmitting the encoded first block to a client device of a user.

19. A non-transitory computer readable medium storing one or more programs for execution by a computing system, wherein the computing system comprises a graphics processing unit (GPU), a plurality of encoder cores and a data buffer, the one or more programs comprising instructions for:

allocating the plurality of encoder cores to process in parallel a plurality of image tiles of frame data that is stored in the data buffer and defined in accordance with a rendering specification, wherein the plurality of image tiles comprises a first image tile assigned to a first encoder core, and wherein the first image tile includes a first sequence of blocks; and at the first encoder core:

obtaining from the data buffer a first block of the first sequence of blocks of the first image tile assigned to the first encoder core;

obtaining boundary information of the first block;

while or prior to obtaining from the data buffer a second block that follows but is not directly adjacent to the first block in the first sequence of blocks, encoding the first block of the first sequence of blocks based on the boundary information; and transmitting the encoded first block to a client device of a user.

\* \* \* \* \*